United States Patent [19]
Nakakimura et al.

[11] Patent Number: 5,915,109
[45] Date of Patent: *Jun. 22, 1999

[54] MICROPROCESSOR FOR PROCESSING A SATURATION INSTRUCTION OF AN OPTIONAL-BIT LENGTH VALUE

[75] Inventors: Kiyoshi Nakakimura; Edgar Holmann, both of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/772,287

[22] Filed: Dec. 20, 1996

[30] Foreign Application Priority Data

Aug. 12, 1996 [JP] Japan .................................. 8-212890

[51] Int. Cl.⁶ ...................................................... G06F 9/302
[52] U.S. Cl. ...................................... 395/562; 364/745.03
[58] Field of Search ...................................... 395/561, 562, 395/567; 364/737, 745.03, 748.04

[56] References Cited

U.S. PATENT DOCUMENTS

| | | | |
|---|---|---|---|
| 4,641,260 | 2/1987 | Fukukita et al. | 364/737 |
| 4,933,878 | 6/1990 | Guttag et al. | 345/431 |
| 5,272,659 | 12/1993 | Starr | 364/745.03 |
| 5,448,509 | 9/1995 | Lee et al. | 364/737 |
| 5,684,728 | 11/1997 | Okayama et al. | 364/736.5 |

FOREIGN PATENT DOCUMENTS 4-315275  11/1992  Japan .
5-313856  11/1993  Japan .
7-49767   2/1995   Japan .
7-210368  8/1995   Japan .
7-334346  12/1995  Japan .

OTHER PUBLICATIONS

Japanese Publication with English Abstract, Intel's MMX Speeds Multimedia, Gwennap, Microprocessor Report, vol. 10, No. 3, Microdesign Resource Corp., Mar. 5, 1996.

Accelerating Multimedia with Enhanced Microprocessors, Lee, IEEE, Apr., 1995, pp. 22–31.

Mitsubishi Electric Corp., "D30V Architecture", Ver. 0.02, pp. 1-1-5-4.

A VLIW Processor for Multimedia Applications, Holmann et al., Mitsubishi Electric Corporation, System LSI Laboratory, Submitted to HOT Chips 8 Symposium, Stanford, California, Mar. 18, 1996, pp. 1–3.

*Primary Examiner*—Parshotam S. Lall
*Assistant Examiner*—Viet Vu
*Attorney, Agent, or Firm*—Burns, Doane, Swecker & Mathis, L.L.P.

[57] ABSTRACT

A microprocessor having a saturation operation unit comprising a decoder 220 for decoding a 4-bit saturation operation bit length data item into a 16-bit value, a decoder 221 for decoding a 5-bit saturation operation bit length data item into 1 to a 32-bit value, selectors 236, 237, 238, 239 and an operation unit 250 for outputting values stored in the decoder 220 and 221 or values obtained by inverting the values, per bit, stored in the decoder 220 and 221 when a target saturation operation value is over a saturated value detected by using selectors 234, 235 and operation units 226 and 227.

20 Claims, 8 Drawing Sheets

FIG. 3

| Format | Bit positions | Notes |
|---|---|---|
| Short M | `[OPCODE(0-7)] [X(7-9)] [Ra(9-15)] [Rb(15-21)] [SOURCE(21-27)]` — 111 | fields: 120, 124, 121, 122, 123 |
| Short A | `[OPCODE] [X'] [0] [Ra] [Rb] [SOURCE]` — 112 | fields: 120, 125, 121, 122, 123 |
| Short B1 | `[OPCODE] [0] [0] [0] [0] [Rc]` — 113 | fields: 120, 126 |
| Short B2 | `[OPCODE] [1] [0] [DISPLACEMENT:18]` — 114 | fields: 120, 127 |
| Short B3 | `[OPCODE] [Y] [Z] [Ra] [SOURCE]` — 115 | fields: 120, 129, 130, 121, 128 |
| Short D1 | `[OPCODE] [Y] [0] [Ra] [SOURCE]` — 116 | fields: 120, 129, 121, 128 |
| Short D2 | `[OPCODE] [Y] [0] [ct:6] [SOURCE]` — 117 | fields: 120, 129, 131, 128 |
| Long 1 | `[OPCODE] [1] [0] [Ra] [Rb] [IMMEDIATE VALUE:32]` — 118 | fields: 120, 121, 122, 132 |
| Long 1 | `[OPCODE] [1] [Z] [Ra] [Rb] [IMMEDIATE VALUE:32]` — 119 | fields: 120, 133, 121, 122, 132 |

(123)
X=00 => SOURCE=Rc
X=01 => SOURCE=Rc; Rb++
X=11 => SOURCE=Rc; Rb--
X=10 => SOURCE=IMMEDIATE VALUE:6

(123)
X'=0 => SOURCE=Rc
X'=1 => SOURCE=IMMEDIATE VALUE:6

(128)
Y=0 => SOURCE=Rc
Y=1 => SOURCE=IMMEDIATE VALUE:12
Z=0 => TEST FOR ZERO
Z=1 => TEST FOR VALUES OTHER THAN ZERO

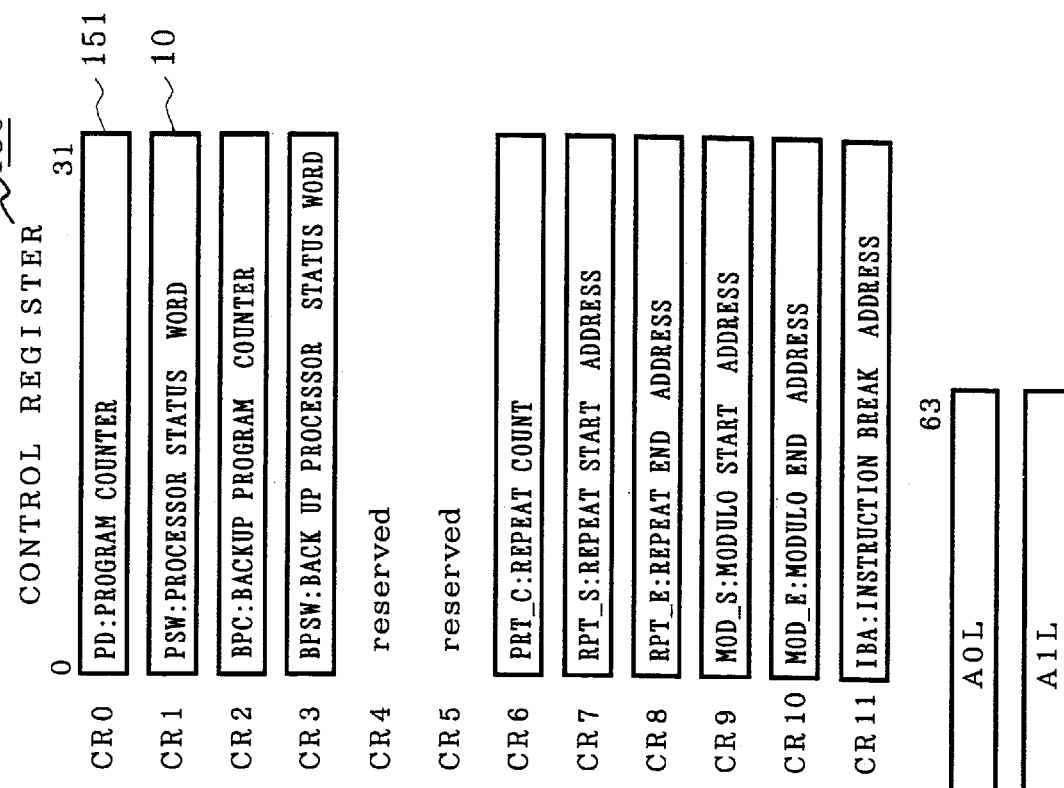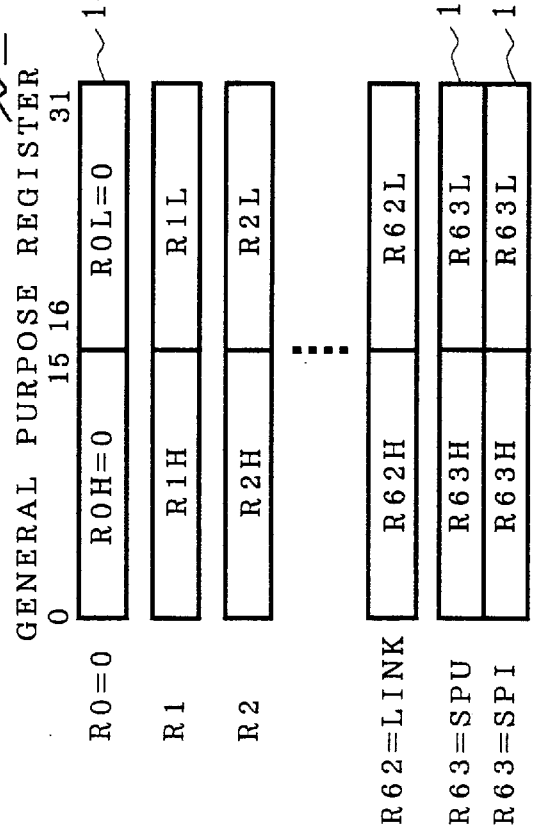

| SM | 0 | EA | DB | 0 | IE | RP | MD | 0 | 0 | 0 | 0 | 0 | 0 | 0 | 0 |
|---|---|---|---|---|---|---|---|---|---|---|---|---|---|---|---|

171 172 173 174 175 176

180

| 0 | F0 | 0 | F1 | 0 | F2 | 0 | F3 | 0 | F4 | 0 | F5 | 0 | F6 | 0 | F7 |
|---|---|---|---|---|---|---|---|---|---|---|---|---|---|---|---|

181 182

MICROPROCESSOR FOR PROCESSING A SATURATION INSTRUCTION OF AN OPTIONAL-BIT LENGTH VALUE

BACKGROUND OF THE INVENTION

1. Field of the Invention

The present invention relates to a microprocessor including saturation arithmetic instructions as multimedia instructions for setting an arithmetic result into a predetermined value of optional bit length when an overflow has occurred.

2. Description of Related Art

There are applications requiring execution of saturation operations when an overflow has occurred as an operation result of an operation circuit. In order to consent to this request, there are microprocessors having conventional saturation operation instructions. For example, there are the microprocessors having conventional saturation operation instructions disclosed in the literatures, Japanese laid-open publication numbers: JP-A-7/210368, JP-A-7/49767, JP-A-5/313856, JP-A-7/334346 and JP-A-4/315275.

Like video code processing based on MPEG2, it must be required to perform a saturation operation to saturate data into data having a maximum-bit length during decode operation in an application to provide a data item of a relatively smaller-bit length as a decoding result. For example, when an operation result becomes "1000 (without sign)" it must be required to saturate this operation result into "1111 (without sign)". Further, it must also be required to perform saturation operations in which each of results of decoding operations is saturated into data having its maximum bit length according to kinds of the decoding operations. In general, picture elements (or pixels) of data of moving pictures are expressed by three types of colors, R (red), G (green) and B (blue) and each R, G and B is given with four-bits, six-bits or eight bits. When four-bits are used for each of R, G and B, 4096 kinds of colors can be expressed. When six-bits for each, approximately 260 hundred types of colors can be shown and when eight bits, approximately 16.7 million kinds of colors can be expressed. Thus, the number of bits to be used is different according to the number of colors to be expressed. This requires to execute saturation operations in order to set processing resultants into the maximum value in each of many types of bit lengths corresponding to kinds of the data processing.

In the MMX architecture advanced by Intel corp. as multimedia extended instructions, new 57 instructions are added into an instruction set. In the instruction set, there are following added saturation instructions which are combination instructions combined between saturation operations and other operations:

PACKUSWB: Generate one byte data type from two word data types (without sign),

PACKSS [WB, DW]: Generate [byte type data, word type data] from [word type data, double word type data] (with sign), PADDS [B, W]: Add [byte type data, word type data] (with sign), PADDUS [B, W]: Add [byte type data, word type data] (without sign), PSUBS [B, W]: Subtract [byte type data, word type data] (with sign), and PSUBUS [B, W]: Subtract [byte type data, word type data] (without sign).

Each of the instructions described above can operate saturation operation only for one byte data or one word data, but can not perform any saturation operation for data having optional bit length in one instruction. In the PA-RISC introduced by Hewlett Packard corp., it must be required to perform several instructions in order to perform saturation operation for data having optional bit length, namely it is difficult to perform it in one instruction.

Since the conventional microprocessors have the configuration described above, it is difficult to perform any saturation operation for data having optional bit length in one instruction and it also be difficult for the conventional microprocessors to provide convenient multimedia instructions capable of processing saturation operations at high speed rate.

SUMMARY OF THE INVENTION

Accordingly, an object of the present invention is, with due consideration to the drawbacks of the conventional microprocessors having multimedia instructions for example saturation instructions, to provide a microprocessor including saturation instructions as multimedia instructions each of which is capable of performing a saturation operation to set an operation result into data of optional data length within execution of only one instruction.

In accordance with a preferred embodiment according to the present invention, a microprocessor having saturation operation instructions comprises an instruction decoder for decoding instructions, a plurality of register for storing data items, and an instruction execution section for executing said instructions based on outputs from said instruction decoder, said instruction execution section comprising a saturation operation unit for executing said saturation operation instructions, said saturation operation unit comprising optional-bit length saturation means for saturating a target saturation operation value into a saturated value when said target saturation operation value being over said saturated value expressed by using optional-bit length data specified by said instruction.

In the microprocessor having saturation instructions as another preferred embodiment according to the present invention, said optional-bit saturation means comprises judgement means for judging whether or not said target saturation operation value is over said saturated value, saturated value generation means for generating a saturated value of an optional-bit length specified by said instruction, and output means for outputting said saturated value transferred from said saturated value generation means when said judgement means detects said target saturation operation value is over the saturated value.

In the microprocessor having saturation instructions as another preferred embodiment according to the present invention, said optional-bit length saturation means or said output means comprises zero saturation means for saturating a negative target saturation operation value into zero.

In the microprocessor having saturation instructions as another preferred embodiment according to the present invention, said optional-bit length saturation means or said saturated value generation means comprises sub-word saturated value generation means for generating a saturated value per sub-word, and said optional-bit length generation means or said judgement means comprises sub-word judgement means for judging whether or not said target saturation operation value is over said saturated value.

In the microprocessor having saturation instructions as another preferred embodiment according to the present invention, said optional-bit length saturation means or said saturated value generation means comprises a decoder for decoding a saturated value expressed by using a bit length specified by said instructions into a binary value having a bit length of said target saturation operation value.

In the microprocessor having saturation instructions as another preferred embodiment according to the present invention, said optional-bit length saturation means or said saturated value generation means comprises a shifter for generating a saturated value by shifting data, each-bit of said data being 1.

In the microprocessor having saturation instructions as another preferred embodiment according to the present invention, said optional-bit length saturation means or said judgement means comprises a shifter for shifting said target saturation operation value by a bit length specified by said instructions.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 3 is a diagram explaining detailed contents of operation fields in the instruction formats shown in FIGS. 2A and 2B;

FIGS. 4A, 4B and 4C are diagrams explaining a register configuration in the microprocessor of the embodiment shown in FIG.1;

FIG. 5 is a diagram showing detailed contents of the PSW in the microprocessor of the preferred embodiment shown in FIG. 1;

DESCRIPTION OF THE PREFERRED EMBODIMENTS

Other features of this invention will become apparent through the following description of preferred embodiments which are given for illustration of the invention and are not intended to be limiting thereof.

Preferred embodiments of the microprocessor according to the present invention will now be described with reference to the drawings.

First embodiment

Figure 1:
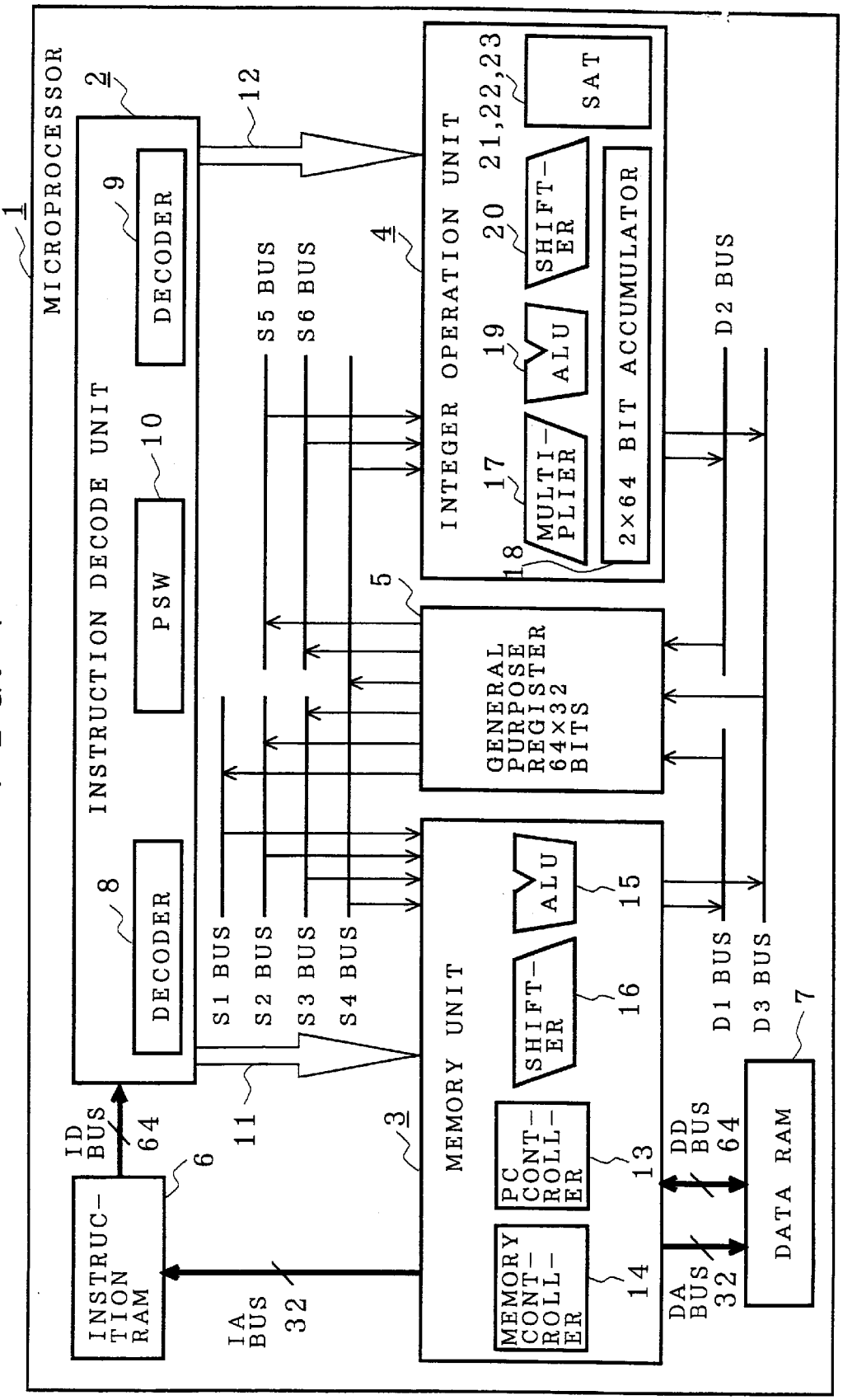
FIG. 1 is a block diagram showing a configuration of the microprocessor of the preferred embodiment according to the present invention.

FIG. 1 is a block diagram showing a configuration of the microprocessor of the preferred embodiments according to the present invention. This microprocessor is a 32 bit microprocessor having 32 bit internal data buses. In FIG. 1, the reference number 2 designates an instruction decode unit (instruction decoder) for decoding instruction codes transferred from an instruction RAM 6 through a ID bus of a 64 bit width, 3 denotes a memory unit for performing address calculation operation, 4 indicates an integer arithmetic unit (instruction execution section) for performing a logic operation and a shift operation, 5 designates a general purpose register consisting of 32 bits×64 words, and the reference number 7 indicates a data RAM for storing data.

In the instruction decode unit 2, the reference numbers 8 and 9 designate decoders each of which decodes instructions, the reference number 10 indicates a Processor Status Word (hereinafter referred to as "PSW") for indicating the state of a microprocessor. The instruction decode unit 2 generates a control signal 11 by using a decode result of the decoder 8 and the content of the PSW 10 and then provides the control signal 11 to the memory unit 3. In addition, the instruction decode unit 2 further generates a control signal 12 based on a decode result of the decoder 9 and the content of the PSW 10 and then transfers the control signal 12 to the integer arithmetic unit 4.

In the memory unit 3, the reference number 13 a Program Counter (PC) control section for calculates a new PC value obtained by adding a current PC value by eight for an instruction to be executed in a following step when instruction not including jump and branch operations is executed, for adding a current PC value by a branch displacement during execution of instruction including jump and branch operations, and for calculate a PC value, according to an addressing mode designated in the arithmetic operation, to be used for a target instruction indicated by a jump operation.

The PC control section 13 transfers the calculated PC value to the instruction RAM 6 through an Instruction Access (IA) bus of a 32-bit bus width in order to output an instruction code from the instruction RAM 16. The reference number 14 denotes a memory control section for controlling access operation to data that will become an operand. This memory control section 14 transfers an address data to the data RAM 7 through a DA bus of a 32-bit bus width in order to access data to be required for execution of the instruction from the data RAM 7 through a DD bus of a 64-bit bus width. The reference number 15 designates an arithmetic Logic Unit (ALU) for executing arithmetic logic operations by using a maximum of 3 word data transferred from the general purpose register 5 through S1, S2 and S3 buses each bus has a 32-bit bus width and for transferring operation results to the general purpose register 5 through a D1 bus of a 32-bit bus width. The reference number 16 denotes a shifter for executing a shift operation by using data transferred from the general purpose register 5 through the S1, S2 and S3 buses and then for transferring an operation result to the general purpose register 5 through the D1 bus.

The microprocessor of the first embodiment can transfer four words, each word being a 32-bit length, through the S1, S2, S3 and S4 buses at the same time. Accordingly, for example, following two operation can be executed at the same time: data stored in the third register is stored into a memory field addressed by a sum of data items stored in both the first and second registers; and a content stored in the fourth register is stored into a memory field addressed by a value obtained by adding the address of a memory field, into which the content in the third register has been stored, by a predetermined value. Furthermore, the memory unit 3 can transfer an arithmetic result of two word data executed in the memory unit 3 or two word data transferred from the data RAM 7 into the general purpose register 5.

In the integer arithmetic operation unit 4, the reference number 17 designates a multiplier for executing multiplication operation of a maximum of three word data transferred from the general purpose register 5 through the 32 bit buses such as the S4, S5 and S6 buses and for transferring operation results to the general purpose register 5 through the 32 bit buses such as the D2 and D3 buses. The reference number 18 indicates an accumulator (ACC) for accumulating arithmetic results and then storing the accumulated data or for subtracting arithmetic results and then storing the subtracted result. In the microprocessor of the preferred embodiment, two 64-bit accumulators are incorporated. The reference number 19 designates an arithmetic logic unit (ALU) for performing arithmetic logic operation by using a maximum of 3 word data items transferred from the general purpose register 5 through the S4, S5 and S6 buses and then for transferring arithmetic results to the general purpose register 5 through the D2 and D3 buses. The reference number 20 indicates a shifter for performing shift operation by using data transferred from the general purpose register 5 through the S4, S5 and S6 buses and then for transferring operation results to the general purpose register 5 through the D2 and D3 buses. The reference numbers 21, 22, 23 denote saturation arithmetic units for performing saturation operations by using data transferred from the general purpose register 5 through the S4, S5 and S6 buses and then for transferring operation results to the general purpose register 5 through the D2 and D3 buses. The configurations and operations of the saturation operation units 22 and 23 will be explained in the second embodiment and the third embodiment, respectively, in detail.

The microprocessor of the preferred embodiment can read maximum of six kinds of register values from the general purpose register 5. The readout data items are transferred onto the S1, S2, S3, S4, S5 and S6 buses. In addition, a maximum of three kinds of register values can be written into the general purpose register 5 through the D1, D2 and D3 buses at the same time.

Figures 2A, 2B:
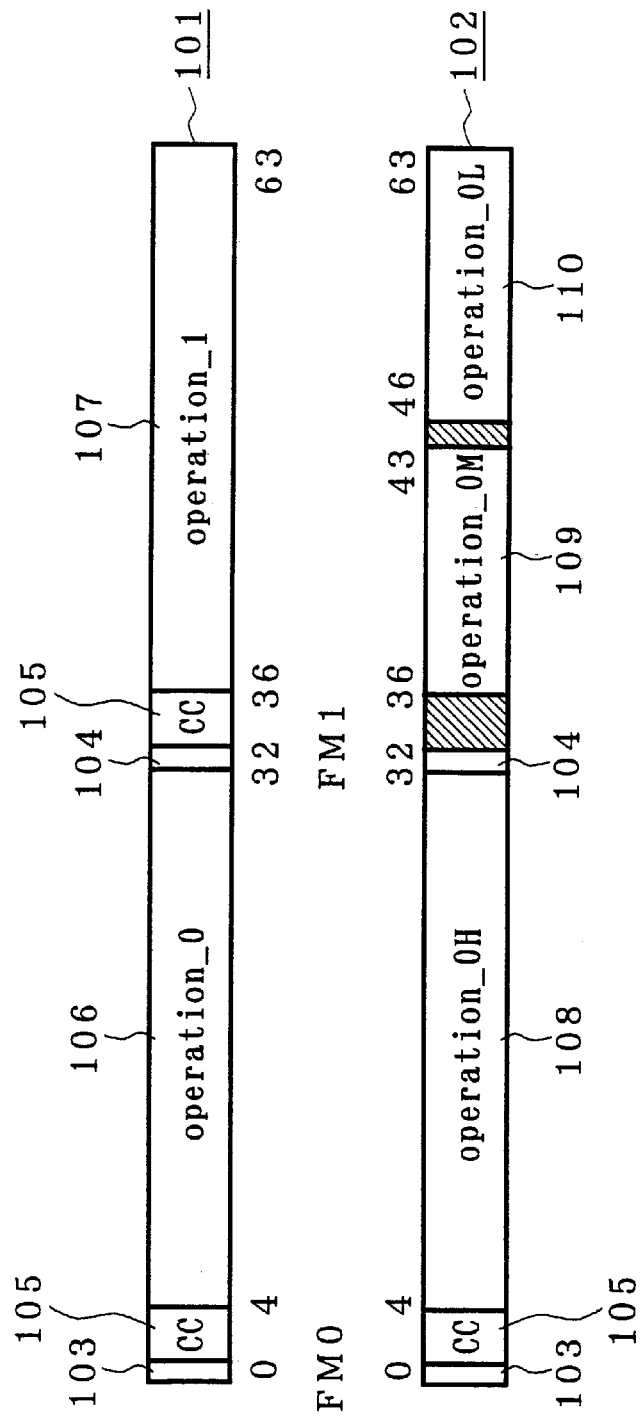
FIGS. 2A and 2B are diagrams explaining formats used in the microprocessor of the embodiment shown in FIG. 1.

FIGS. 2A and 2B are diagrams explaining formats used in the microprocessor of the preferred embodiment according to the present invention shown in FIG. 1.

The microprocessor of the preferred embodiment according to the present invention has a two-instruction format 101 and a single instruction format 102 shown in FIG. 2A and FIG. 2B, respectively. The two instruction format 101 indicates two operations. The single instruction format 102 indicates one instruction.

The two-instruction format 101 includes a format field consisting of fields 103 and 104, two operation fields 106 and 107 and two 3-bit CC fields (or execution condition fields) corresponding to the operation fields 106 and 107, respectively.

The single instruction format 102 has a format field consisting of fields 103 and 104, an operation field and a 3-bit CC field 105 (or execution condition fields) corresponding to the operation field. This operation field consisting of fields 108, 109 and 110.

The format fields 103 and 104 forming the format field are defined as follows:

| Code in Format | Number of | Issuing order | |
|---|---|---|---|
| FM | Instructions | Operation_0 | Operation_1 |
| 00 | two | 1st | 1st |
| 01 | two | 1st | 2nd |
| 10 | two | 2nd | 1st |
| 11 | one | 1st | — | where, FM indicates a two-bit value stored in the fields 103 and 104.

When FM=00, the instruction to be executed is a two-operation instruction. In this case, both of two instructions, the operation_0 indicated by the operation field 106 and the operation_1 indicated by the operation field 107, are executed concurrently in parallel in a clock cycle immediately after a decoding operation. The operation_0 is executed in the memory unit 3 and the operation_1 is performed in the integer arithmetic operation unit 4.

When FM=01, an instruction to be executed is a two-operation instruction. In this case, the operation_0 is executed in a clock cycle immediately after a decoding operation and the operation_1 is executed in a clock cycle which is delayed from the execution of the operation_0 by one clock cycle.

When FM=10, an instruction to be executed is a two operation instruction. In this case, the operation_1 is executed in a clock cycle immediately after decoding operation and then the operation_0 is executed in a clock cycle which is delayed from the execution cycle of the operation_1 by one cycle.

FM=11, an instruction to be executed is a single operation instruction. In this case, the operation indicated by using the operation field consisting of the fields 108, 109 and 110 is executed in a clock cycle immediately after decoding cycle.

3-bit CC field 105 (or the execution condition field) defined as follows:

| | Code | Conditions to be executed |
|---|---|---|
| CC= | 000 | Always |
| | 001 | F0= T and F1= don't care |
| | 010 | F0= F and F1= don't care |
| | 011 | F0= don't care and F1= T |
| | 100 | F0= don't care and F1= F |
| | 101 | F0= T and F1= T |
| | 110 | F0= T and F1= F |
| | 111 | Reserved |

The 3-bit CC field 105 (or the execution condition field) determines whether the execution of the operation_0 in the operation fields 106 and 107, the execution of the operation_1 and the operations of the operation fields 108, 109 and 110 are valid or invalid based on the status of the F0 and F1 flag bits as execution control flags. The execution control flags F0 and F1 will be explained later in detail.

The valid of the operation means that the operation results are written into the registers, the memories and the flags so that the operation results are kept into them. The invalid of the operation means that the operation results are not written into the registers, the memories and the flags, so that the operation results do not kept into them as if a NOP instruction has been executed.

When the value CC of the execution condition field 105 is zero (CC=000), the operation always become valid in spite of the values of the operation control flags F0 and F1.

When CC=001, the operation becomes valid only when the execution control flag F0=truth. In this case, the state of the execution control flag F1 does not care.

When CC=010, the operation becomes valid only when F0=false. In this case, the status of the F1 flag does not care.

When CC=011, the operation becomes valid only when F1=truth. In this case, the status of the F0 flag does not care.

When CC=100, the operation becomes valid only when F1=false. In this case, the status of the F0 flag does not care.

When CC=101, the operation becomes valid only when F0=truth and F1=truth.

When CC=110, the operation becomes valid only when F0=truth and F1=false.

When CC=111, any user can not use an instruction based on CC=111 because operation under CC=111 is undefined.

FIG. 3 is a diagram explaining detailed contents of operation fields 106 to 110 in the instruction formats 101 and 102 shown in FIGS. 2A and 2B.

Each of the short formats 111 to 117 comprises a 28-bit short type operation field 106 or 107. Each of the length formats 118 and 119 comprises a 54-bit length type operation fields 108, 109 or 110.

The format 111 (Short M, see FIG. 3) consists of the field 120 (an 8-bit opcode field) designating a content of operation, the two field 121 and 122 (two 6-bit register specifier fields Ra and Rb) each designates a register number, the field 123 (a 6-bit register specifier field) for specifying a register number or an immediate value and the field 124 (a 2-bit operand identifier X) for indicating the kind of a content stored in the field 123.

As shown in FIG. 3, when the value X stored in the field 124 is 00, 01 or 11, the content of the field 124 indicates that the field 123 stores a register number. When the value of the field 123 is 10, the content in the field 123 indicates that the field 123 stores an immediate value. This format 111 is used for load-store instructions such as memory access operations with register indirect addressing modes.

The format 112 (Short A, see FIG. 3) consists of the field 120 (an 8-bit opcode field) designating a content of operation, the two field 121 and 122 (two 6-bit register specifier fields Ra and Rb) each designates a register number, the field 123 (a 6-bit register specifier field) for indicating a register number or an immediate value and the field 125 (a 1-bit operand identifier Y) for indicating the kind of a content stored in the field 123.

As shown in FIG. 3, when the value X' stored in the field 125 is "0", the content in the field 125 indicates that the field 123 designates a register number and when the value X' is "1", the content in the field 125 indicates that the field 123 stores an immediate value.

This format 112 is used for load-store instructions, such as arithmetic operations, logic operations, shift operations and so on, with register indirect addressing modes.

The format 113 (Short B1) consists of the field 113 (a 8-bit opcode field) designating a content of operation and the field 126 (a 6-bit register specifier Rc field) for specifying a register number. This format 113 is used for jump and branch instructions with a register address (Rc).

The format 114 (Short B2) consists of a field 120 (an 8-bit opcode field) designating a content of operation and a field 127 of a 18-bit displacement (a 18-bit displacement field). This format 114 is used for jump and branch instructions with an immediate 18-bit displacement.

The format 115 (Short B3) consists of the field 120 (an 8-bit opcode field) for designating a content of operation, the field 121 (a 6-bit register specifier Ra field) for designating a register number, the field 128 for designating a register number or an immediate value of a 12-bit length, the field 129 for indicating that the field 128 stores the register number or the immediate value, and the field 130 for indicating either a conditional jump operation or a conditional branch operation is performed based on the content in the field 121 of a zero judgement. This format 115 is used for conditional jump instructions and conditional branch instructions.

The format 116 (Short D1) consists of the field 120 (an 8-bit opcode field) for designating a content of operation, the field 121 (a 6-bit register specifier Ra field) for designating a register number, the field 128 for designating a register number or an immediate value of a 12 bit length and the field 129 (a 1-bit operand identifier Y field) for identifying whether the content in the field 128 is the register number or the immediate value. This format 16 is used for conditional jump instructions, conditional branch instructions and repeat instructions.

The format 117 (Short D2) consists of the field 120 (an 8-bit opcode field) for designating a content of operation, the field 128 for designating a register number or an immediate value of a 12-bit length, the field 129 (a 1-bit operand identifier Y field) for indicating whether the content in the field 128 is the register number or the immediate value and the field 131 (a 6-bit displacement field ct:6) used for delayed instructions. This format 117 is used for delayed jump instructions, delayed branch instructions and repeat instructions.

The format 118 (Length 1) consists of the field 120 (an 8-bit opcode field) for designating a content of operation, the two fields 121 and 122 for designating register numbers and the field 132 for designating an immediate value of a 32-bit length. This format 118 is used for all instructions that take a 32-bit immediate operand such as complicated arithmetic operations, arithmetic operations using a large immediate value, memory access operation of register relative indirect addressing with a large-bit displacement, branch instructions with a large-displacement and jump instructions to absolute addresses (or unsigned addresses).

The format 119 (Length 2) consists of the field 120 (an 8-bit opcode field) for identifying a content of operation, the two fields 121 and 122 for designating register numbers, the field 132 for designating an immediate value of a 32-bit length and the field 133 for indicating either a conditional jump operation or a conditional branch operation is performed based on the content in the field 121 of a zero judgement. This format 119 is used for condition jump instructions and condition branch instructions with a large branch displacement.

FIGS. 4A, 4B and 4C are diagrams explaining a register configuration in the microprocessor as a preferred embodiment according to the present invention shown in FIG.1.

The microprocessor of the embodiment shown in FIG. 1 comprises the general purpose register 5 including sixty-four 32-bit general purpose registers shown in FIG. 4A, twelve control registers 150 and two accumulators 18 shown in FIG. 4C. The value in the general purpose register R0 is always zero. Therefore writing data into the register R0 is negligible.

The general purpose register R62 is a link register in which a return address from a subroutine is set. The general purpose register R63 is a stack pointer operating as an user stack pointer (USP) or an interrupt stack pointer (SPI) according to a value of a SM field in the PSW 10. The control register 150 comprises a program counter 151, the PSW 10 and various kinds of dedicated registers.

In operations using the format 112 shown in FIG. 3, upper 16 bits and lower 16 bits in each of the 64 general purpose registers 5 can be used independently.

FIG. 5 is a diagram showing detailed contents of the PSW 10 in the microprocessor as a preferred embodiment according to the present invention shown in FIG. 1.

As shown in FIG. 5, the upper 16 bits 170 in the PSW 10 includes the SM field 171 for switching the stack pointer, the EA field 172 for showing a detection result of self-debug trap (SDBT), the DB field 172 for indicating allowance (enabled) of the SDBT, the IE field 174 for indicating an interrupt allowance, the RP field 175 for indicating an allowance (enabled) of repeat operation and the MD field 176 for indicating an allowance (enabled) of modulo addressing. The lower 18 bits 180 includes 8 flags. The F0 flag 181 and F1 flag 182 (execution control flags) indicate valid or invalid of operation. A value of each flag is changed according to results of comparison operation and arithmetic operations, or according to initializing operations for these flags, or by writing an optional value into the flag field 180 in flag writing operations. Contents in the flag field 180 are read out by flag-value readout operation.

Each flag in the flag fields 170 and 180 is defined as follows:
SM=0: Stack mode 0→SPI is used
SM=1: Stack mode 1→SPI is used
EA=0: SDBT is not detected
EA=1: SDBT is detected
DB=0: SDBT is not accepted
DB=1: SDBT is accepted
IE=0: Interrupts are masked
IE=1: Interrupts are accepted.
RP=0: A block repeat is inactive
RP=1: A block repeat is active
MD=0: Modulo addressing is disabled
MD=1: Modulo addressing is enable
F0: general purpose flag (execution control flag)
F1: general purpose flag (execution control flag)
F2: general purpose flag
F3: general purpose flag
F4(S): Saturation operation flag
F5(V): Overflow flag
F6(VA): Accumulated overflow flag
F7(C): Carry/ Borrow flag Hereinafter, the instruction list of the microprocessor will be described.
A. Microprocessor function instructions
A-1. Load/Store instructions
LDB: Load one byte to a register with sign extension
LDBU: Load one byte to a register with zero extension
LDH: Load one half-word to a register with sign extension
LDHH: Load one half-word to a register high
LDHU: Load one half-word to a register with zero extension
LDW: Load one word to a register
LD2W: Load two words to registers
LD4BH: Load four bytes to four half-words in two registers with sign extension
LD4BHU: Load four bytes to four half-words in two registers with zero extension
LD2H: Load two half-words to two words in two registers with sign extension
STB: Store one byte from a register
STH: Store one half-word from a register
STHH: Store one half-word from a register high
STW: Store one word from a register
ST2W: Store two words from registers
ST4HB: Store four bytes from four half-words from two registers
ST2H: Store two half-words from two registers
MODDEC: Decrement a register value by a 5-bits immediate value
MODINC: Increment a register value by a 5-bits immediate value
A-2. Transfer instructions
MVFSYS: Move a control register to a general purpose register
MVTSYS: Move a general purpose register to a control register
MVFACC: Move a word from an accumulator
MVTACC: Move two general purpose registers to an accumulator A-3. Compare instructions
CMPcc: Compare cc=EQ(equal), NE (not equal), GT(greater than), GE(greater than or equal), LT(less than), LE(less than or equal), PS(both positive), NG(both negative)
CMPcc: Compare unsigned cc=GT, GE, LT, LE
A-4. Maximum/ Minimum instructions reserved
A-5. Arithmetic operation instructions
ABS: Absolute
ADD: Add
ADDC: Add with carry
ADDHppp: Add half-word ppp=LLL(register lower, register lower, register lower), LLH(register lower, register lower, register higher), LHL, LHH, HLL, HLH, HHL, HHH
ADDS: Add register Rb with the sign of the third operand
ADDS2H: Add sign to two half-words
ADD2H: Add two pairs of half-words
AVG Average with rounding towards positive infinity
AVG2H: Average two pairs of half-words rounding towards positive infinity
JOINpp: Join two half-words pp=LL, LH, HL, HH
SUB: Subtract
SUBB: Subtract with borrow
SUBHppp: Subtract half-word ppp=LLL, LLH, LHL, LHH, HLL, HLH, HHL, HHH
SUB2H: Subtract two pairs of half-words
A-6. Logical operation instructions
AND: logical AND
OR: logical OR
NOT: logical NOT
XOR: logical exclusive OR
ANDFG: logical AND flags
ORFG: logical OR flags
NOTFG: logical NOT a flag
XORFG: logical exclusive OR flags
A-7. Shift operation instructions
SRA: Shift right arithmetic
SRA2H: Shift right arithmetic two half-words
SRC: Shift right concatenated registers
SRL: Shift right logical
SRL2H: Shift right logical two half-words
ROT: Rotate right
ROT2H: Rotate right two half-words
A-8. Bit operation instructions
BCLR: Clear a bit
BNOT: Invert a bit
BSET: Set a bit
BTST: Test a bit
A-9. Branch instructions
BRA: Branch
BRATZR: Branch if zero
BRATNZ: Branch if not zero
BSR: Branch to subroutine
BSRTZR: Branch to subroutine if zero
BSRTNZ: Branch to subroutine if not zero
JMP: Jump
JMPTZR: Jump if zero
JMPTNZ: Jump if not zero
JSR: Jump to subroutine
JSRTZR: Jump to subroutine if zero
JSRTNZ: Jump to subroutine if not zero
NOP: No Operation
Delayed branch, Jump instructions
DBRA
DBRAI
DBSR
DBSRI DJMP
DJMPI
DJSR
DJSRI
A-10. OS-related instructions
TRAP: Trap
REIT: Return from exception, interrupts and traps
B. DSP function instructions
B-1. Arithmetic operation instructions
MUL: Multiply
MULX: Multiply with extended precision
MULXS: Multiply and shift to the right by one with extended precision
MULX2H: Multiply two pairs of half-words with extended precision
MULHXpp: Multiply two half-words with extended precision pp=LL, LH, HL, HH
MUL2H: Multiply two pairs of half-words
MACa: Multiply and add a (designated by accumulator)=0,1
MACSa: Multiply, shift to the right by one and add a=0, 1
MSUBa: Multiply and subtract a=0, 1
MSUBSa: Multiply, shift to the right by one and subtract a=0, 1
SAT: Saturate
SATHH: Saturate word operand into high half-word
SATHL: Saturate word operand into low half-word
SATZ: Saturate into positive number
SATZ2H: Saturate two half-words into positive numbers
SAT2H: Saturate two half-word operands
where, saturation operations into positive numbers means that a target value to be operated is converted to zero when the target operation value. Accordingly, in saturation operations other than the saturation operations into positive numbers, a value is converted to a maximum positive value (a positive saturated value) when a target value to be operated is positive, a value is converted to a minimum value (a negative saturated value) when it is negative.
B-2. Repeat instructions
REPEAT: Repeat a block of instructions
REPEATI: Repeat a block of instructions immediate The SAT instructions are instructions using a word (a full-word), specify immediate values or register numbers by using operands in SAT instructions and capable of performing saturation operations in order to obtain saturated values each having an optional-bit length.

The SATZ instructions are instructions using a full-word, which specify to saturate an operation result to zero when the operation result is a negative value.

The SAT2H instructions are instructions using a half-word, which specify to saturate an operation result to zero when the operation result is a negative value. These saturation instructions SAT, SATZ, SAT2H and SATZ2H use the formats shown in FIG. 3. In the microprocessor as a preferred embodiment according to the present invention, the full-word consists of 32 bits.

Hereinafter, descriptions of mnemonics and operands of these instructions and actual operation processes will be explained. Each of the reference characters Ra, Rb and Rc designates a 32-bit register. The reference character "" denotes an operation of the ""-th power and [n:m] indicates a reference bit range.

SAT instruction
<Notation>
(1) SAT Ra, Rb, Rc
(2) SAT Ra, Rb, imm:6
<Operation>
bit_sat=Rc[27:31] or imm:6[1:5]; saturate operation bit length

| | |
|---|---|
| if(Rb>2**(bit_sat-1) -1) | Ra=2**(Bit_sat-1)-1 |
| else if(Rb<-2**(bit_sat-1)) | Ra=-2**(bit_sat-1) |
| else | Ra=Rb |

SATZ instruction
<Notation>
(1) SATZ Ra, Rb, Rc
(2) SATZ Ra, Rb, imm:6
<Operation>
bit_sat=Rc[27:31] or imm:6[1:5]; saturate operation bit length

| | |
|---|---|
| if(Rb>2**(bit_sat-1)-1) | Ra=2**(bit_sat-1)-1 |
| else if(Rb<0) | Ra=0 |
| else | Ra=Rb |

SAT2H instruction
<Notation>
(1) AT2H Ra, Rb, Rc
(2) SAT2H Ra, Rb, imm:6
<Operation>
bith_sat=Rc[12:15] or imm:6[2:5]; upper side saturate operation bit length

| | |
|---|---|
| if(Rb[0:15]>2**(bith_sat-1)-1) | Ra[0:15]=2**(bith_sat-1)-1 |
| else | |
| if(Rb[0:15]<-2**(bith_sat-1)) | Ra[0:15]=-2**(bith_sat-1) |
| else | Ra[0:15]-Rb[0:15] |
| if(Rb[16:31]>2**(bitl_sat-1)-1) | Ra[16:31]=2**(bitl_sat-1)-1 |
| else | |
| if(Rb[16:31]<-2**(bitl_sat-1)) | Ra[16:31]=-2**(bitl_sat-1) |
| else | Ra[16:31]=Rb[16:31] |

SATZ2H instruction
<Notation>
(1) SAT2H Ra, Rb, Rc
(2) SAT2H Ra, Rb, imm:6
<Operation>
bith_sat=Rc[12:15] or imm:6[2:5]; upper side saturate operation bit length
bitl_sat=Rc[28:31] or imm:6[2:5]; lower side saturate operation bit length

| | |
|---|---|
| if(Rb[0:15]>2**(bith_sat-1)-1) | Ra[0:15]=2**(bith_sat-1)-1 |
| else | |
| if(Rb[0:15]<0) | Ra[0:15]=0 |
| else | Ra[0:15]=Rb[0:15] |
| if (Rb[16:31]>2**(bitl_sat-1)-1) | Ra[16:31]=2**(bitl_sat-1)-1 |
| else | |
| if(Rb[16:31]<0) | Ra[16:31]=0 |
| else | Ra[16:31]=Rb[16:31] |

Each instruction saturates a target value set in the Rb register to be saturated into a saturated value corresponding to a 4-bit or a 5-bit value or a 4-bit or a 5-bit immediate value stored in a predetermined field in the Rc register. A target value to be saturated is converted to $2^{n-1} -1$ when the target value is a positive value and is over $2^{n-1} -1$ by the SAT or the SAT2H instruction, where a 4-bit value or a 5-bit value is designated by n (=bit_sat). In addition, a target value to be saturated is converted to $-2^{n-1}$ when the target value is a negative value and is less than $-2^{n-1}$ by the SAT or the SAT2H instruction by the SAT or the SAT2H instruction. A target value to be saturated is converted to $2^{n-1}-1$ when the target value is a positive value and is over $2^{n-1}-1$ by the SATZ or the SATZ2H instruction. Furthermore, a target value to be saturated is converted into zero when the target value is a negative value by the SATZ or the SATZ2H instruction. In these cases described above, each target value is expressed by complement on 2.

Figure 6:
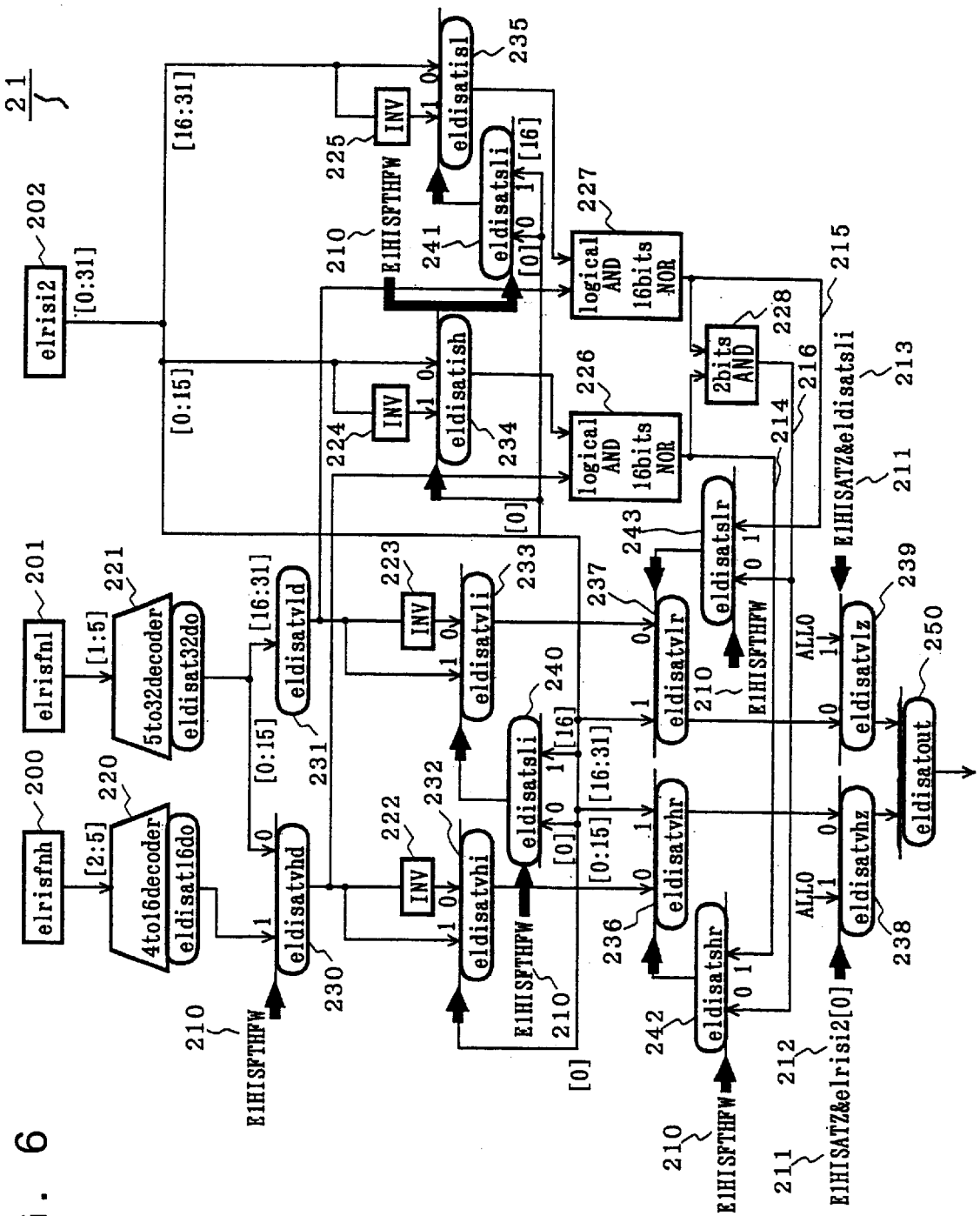
FIG. 6 is a block diagram showing a configuration of a saturation operation unit incorporated in the microprocessor of the first embodiment shown in FIG. 1.

FIG. 6 is a block diagram showing a configuration of a saturation operation unit incorporated in the microprocessor of the embodiment according to the present invention shown in FIG. 1. In FIG. 6, the reference number 200 designates a 4-bit register for storing one saturation operation bit length bith_sat in a saturation operation instruction treating a half-word. The reference number 201 designates a 5-bit register for storing a saturation operation bit length bit_sat in a saturation operation instruction using a full-word or a saturation operation bit length bit1_sat in a saturation operation instruction using a half-word, and 202 indicates a 32-bit register for storing a content of the register Rb which is a target value in a saturation operation.

Hereinafter, a content of the register Rb to be a target saturation operation will be expressed by a target saturation operation value Rb.

The reference number 210 designates a control signal (E1HISFTHFW) for indicating that an instruction to be executed is either a half-word instruction or a full-word instruction. When E1HISFTHFW=1, it indicates a half-word instruction and when E1FISFTHFW=0, it a full-word instruction. The reference number 211 denotes a control signal (E1HISATZ) for indicating that an instruction to be executed is either a saturation operation instruction (SATZ instruction or SATZ2H instruction) into a positive number or another saturation operation instruction (SAT instruction or SAT2H instruction). When E1HISATZ=1, E1HISATZ indicates that an instruction to be executed is SATZ instruction or SATZ2H instruction and when E1HISATZ=0, E1HISATZ indicates instructions other than SAT instruction or SAT2H instruction.

The reference number 212 designates the uppermost order bit (elrisi2[0]) as a sign bit for indicating whether a target saturation operation value is a positive number or a negative number. In the microprocessor of the embodiments according to the present invention, the uppermost order bit is designated by the bit "#0". When elrisi2[0]=1 and an instruction to be executed is a full-word instruction, it indicates a target saturation operation value Rb is a negative value. When elrisi2[0]=1 and an instruction to be executed is a half-word instruction, the sign bit elrisi2[0] indicates the upper half-word in a target saturation operation value Rb is negative.

When elrisi2[0]=0 and an instruction to be executed is a full-word instruction, it indicates a target saturation operation value Rb is a positive value. When elrisi2[0]=0 and an instruction to be executed is a half-word instruction, the sign bit elrisi2[0] indicates the upper half-word in a target saturation operation value Rb is positive.

The reference number 213 designates a sign bit eldisatsli as a sign bit for a lower half-word (16 bits) in a target saturation operation value Rb when an instruction to be executed is a half-word instruction, and it becomes the same sign bit as the sign bit 212 only when an instruction to be executed is a full-word instruction. When eldisatsli=1 and an instruction to be executed is a full-word instruction, it indicates that a target saturation operation value Rb is a negative value, and when eldisatsli=0 and an instruction to be executed is a half-word instruction, it indicates that the lower order side in a target saturation operation value Rb is a negative value.

When eldisatsli=0 and an instruction to be executed is a full-word instruction, it indicates that a target saturation operation value Rb is a positive value, and when eldisatsli=0 and an instruction to be executed is a half-word instruction, it indicates that the lower order side in a target saturation operation value Rb is a positive value.

The reference number 214 designates a result signal for indicating a judgement result of a saturation operation for an upper order side in a half-word. When the result signal 214=1, the operation result is not saturated, namely the operation result is not over the saturated value and when the control signal=0, the operation result has been saturated.

The reference number 215 denotes a result signal for indicating a saturation operation judgement result of a half-word of a lower order side in a target saturation operation value. When the result signal 215 is 1, it indicates that the saturation operation result is not saturated and when the result signal 215 is zero, it indicates that the result is saturated.

The reference number 216 is a result signal for indicating a saturation operation judgement result when a full-word instruction is executed. When the result signal 216 is 1, it indicates that the operation result is not saturated and when the result signal 216 is 0, it indicates that the operation result has been saturated.

Because it must be required to show that both the upper 16-bits and the lower 16-bits are not saturated in order to indicate that a full-word is not saturated, the result signal 216 is an AND signal which can be obtained by performing a logical AND operation between the result signals 214 and 215.

The reference number 220 is a decoder (saturated value generation means, an optional bit length saturation means, a sub-word saturated value generation means) for decoding a 4-bit value stores in the register 200 and for outputting a 16-bit value eldisat16do. The relationship between input values and output values in the decoder 200 is shown by the table A as follows:

TABLE A

| 4-bit input value | 16-bit Output value (eldisat16do) |
|---|---|
| 4'B 0001 | 16'H FFFF |
| 4'B 0010 | 16'H FFFE |
| 4'B 0011 | 16'H FFFC |
| 4'B 0100 | 16'H FFF8 |
| 4'B 0101 | 16'H FFF0 |
| 4'B 0010 | 16'H FFE0 |
| 4'B 0111 | 16'H FFC0 |
| 4'B 1000 | 16'H FF80 |
| 4'B 1001 | 16'H FF00 |
| 4'B 1010 | 16'H FE00 |
| 4'B 1011 | 16'H FC00 |
| 4'B 1100 | 16'H F800 |
| 4'B 1101 | 16'H F000 |
| 4'B 1110 | 16'H E000 |
| 4'B 1111 | 16'H C000 |
| 4'B 0000 | 16'H 8000 | where, 4'B designates a binary representation of a 4-bit value and 16'B denotes a hexadecimal representation of a 16-bit value.

The reference number 221 designates a decoder (a saturated value generation means, an optional bit length saturation means) for decoding a 5-bit value stored in the register 201 and for outputting a 32-bit value (eldisat32do).

The relationship between input values and output values is shown by the Table B as follows:

TABLE B

| 5-bit input values | 32-bit output values (eldisat32do) |
|---|---|
| 4'B 00001 | 32'H FFFF FFFF |
| 4'B 00010 | 32'H FFFF FFFE |
| 4'B 00011 | 32'H FFFF FFFC |
| 4'B 00100 | 32'H FFFF FFF8 |
| 4'B 00101 | 32'H FFFF FFF0 |
| 4'B 00110 | 32'H FFFF FFE0 |
| 4'B 00111 | 32'H FFFF FFC0 |
| 4'B 01000 | 32'H FFFF FF80 |
| 4'B 01001 | 32'H FFFF FF00 |
| 4'B 01010 | 32'H FFFF FE00 |
| 4'B 01011 | 32'H FFFF FC00 |
| 4'B 01100 | 32'H FFFF F800 |
| 4'B 01101 | 32'H FFFF F000 |
| 4'B 01110 | 32'H FFFF E000 |
| 4'B 01111 | 32'H FFFF C000 |
| 4'B 10000 | 32'H FFFF 8000 |
| 4'B 10001 | 32'H FFFF 0000 |
| 4'B 10010 | 32'H FFFE 0000 |
| 4'B 10011 | 32'H FFFC 0000 |
| 4'B 10100 | 32'H FFF8 0000 |
| 4'B 10101 | 32'H FFF0 0000 |
| 4'B 10110 | 32'H FFE0 0000 |
| 4'B 10111 | 32'H FFC0 0000 |
| 4'B 11000 | 32'H FF80 0000 |
| 4'B 11001 | 32'H FF00 0000 |
| 4'B 11010 | 32'H FE00 0000 |
| 4'B 11011 | 32'H FC00 0000 |
| 4'B 11100 | 32'H F800 0000 |
| 4'B 11101 | 32'H F000 0000 |
| 4'B 11110 | 32'H E000 0000 |
| 4'B 11111 | 32'H C000 0000 |
| 4'B 00000 | 32'H 8000 0000 | where, 32'H denotes a hexadecimal representation of a 32-bit value.

The reference number 230 designates a selector one of a 16-bit value eldisat16do from the decoder 220 and an upper 16-bit value eldisat32do[0:15] in a 32-bit value eldisat32do from the decoder 221 and for providing a 16-bit value eldisatvhd as selected one. When E1HISFTHFW=1, namely a half-word instruction is executed, the 16-bit value eldisat16do is selected as the selected one and the 16-bit eldisat32do[0:15] is selected as the eldisatvhd to be output. This value eldisat32do[0:15] is a 16-bit value (bit#0 to bit#15) in the upper order side of the 32-bit value eldisat32do.

The reference number 231 denotes a virtual converter used only for this explanation of the saturation operation unit 21 according to the first embodiment. The converter 231 converts a 16-bit value eldisat32do[16:31] of a lower order side (bit#16 to bit#31) in the 32-bit value eldisat32do into a value eldisatvld. Because the 16-bit value eldisat32do [16:31] is substantially equal to the 16-bit value eldisatvld, no converter 231 is incorporated in actual microprocessors.

The reference number 222 is an inverter for inverting a 16-bit value eldisatvhd in bit value, 223 denotes an inverter for inverting a 16-bit value eldisatvld in bit value, and 224 indicates an inverter for inverting a 16-bit value of an upper order side in the target saturation operation value Rb in bit value, and 225 designates an inverter for inverting a 16-bit value of a lower order side [16:31] in the target saturation operation value Rb in bit value.

The reference number 234 designates a selector (a judgement means, an optional bit length saturation means, a sub-word judgement means) for selecting one of a 16-bit value elrisi2[0:15] and its inverted one according to an uppermost bit value (elrish2[0]) and for providing a 16-bit value eldisatish. When the value elrisi2[0]=0, the selector 234 selects the 16-bit value elrish2[0:15] and when the value elrish2[0]=1, it selects the inverted value of the elrish2 [0:15].

The reference number 241 designates a selector for selecting and providing a 1-bit value eldisatsli according to a control signal E1HISFTHFW 210. When the value E1HISFTHFW=0, the uppermost bit (elrisi2[0]) in a value stored in the register 202 is selected and provided, and a value of the bit #16 in a value stored in the register 202 is selected and provided when the value E1HISFTHFW=1.

The reference number 235 denotes a selector (a judgement means, an optional bit length saturation means, a sub-word judgement means) for selecting and providing a 16-bit value elrisi2[16:31] according to the value eldisatsli transferred from the selector 241. When the value eldisatsli=0, the selector 235 outputs a 16-bit value elrisi2[16:31] of a lower-order 16-bit in a value stored in the register and when the value eldisatsli=1, the selector 235 outputs an inverted value of a 16-bit value elrisi2[16:31] of a lower-order 16-bit in a value stored in the register.

The reference number 226 designates an operation unit (a judgement means, an optional bit length saturation means, a sub-word judgement means) for performing a logical AND operation per bit between a 16-bit value eldisatvhd and a 16-bit value eldisatish as an output from the selector 234 and then for performing a NOR operation of a result of the logical AND operation to output one bit value. The reference number 227 designates an operation unit (a judgement means, an optional bit length saturation means, a sub-word judgement means) for performing a logical AND operation per bit between a 16-bit value eldisatvld and a 16-bit value eldisatisl as an output from the selector 235 and then for performing a NOR operation of a result of the logical AND operation to output a 1-bit value.

The reference number 228 denotes an operation unit (a judgement means, an optional bit length saturation means, a sub-word judgement means) for performing a logical AND operation between an output from the operation unit 226 and an output from the operation unit 227.

The reference number 240 designates a selector for receiving the uppermost order bit (elrisi2[0]) in a value stored in the register 202 and a bit #16 (elrisi2[16]) and for outputting a bit value (eldisatsli) according to a control signal (E1HISFTHFW) 210. This selector 240 outputs a value of the uppermost order bit (elrisi2[0]) of a value stored in the register 202 as a value eldisatslib when E1HISFTHFW=0 and it outputs a bit #16 (elrisi2[16] in a value stored in the register 202 when E1HISFTHFW=1.

The reference number 232 designates a selector for receiving a 16-bit value eldisatvhd transferred from the register 230 and its inverted value and for outputting a 16-bit value eldisatvhi according to an uppermost order bit (elrisi2 [0]) of a value stored in the register 202. This selector 232 outputs a 16-bit value eldisatvhd as the eldisatvhi when elrisi2[0]=1 and it outputs an inverted value of the 16-bit value eldisatvhd as the value eldisatvhi when elrisi2[0]=0.

The reference number 233 denotes a selector for receiving a 16-bit value eldisatvld from the virtual converter 231 and its inverted value and for outputting a 16-bit value eldisatvli according to the value eldisatsli transferred from the selector 240. This selector 233 outputs a 16-bit value eldisatvhd as the eldisatvli when eldisatsli=1 and it outputs an inverted value of the 16-bit value eldisatvld as the value eldisatvli when eldisatsli=0.

The reference number 242 designates a selector for selecting one of an output from the operation unit 226 and an output of the operation unit 228 according to a value of a control signal (E1HISFTHFW) 210 and for outputting a bit value eldisatshr. This selector 242 selects the output from the operation unit 228 as eldisatshr when E1HISFTHFW=0 and it selects the output from the operation unit 226 as eldisatshr when E1HISFTHFW=1.

The reference number 243 designates a selector for selecting one of an output from the operation unit 226 and an output of the operation unit 227 according to a value of a control signal (E1HISFTHFW) 210 and for outputting a bit value eldisatslr. This selector 243 selects the output from the operation unit 228 as eldisatslr when E1HISFTHFW=0 and it selects the output from the operation unit 227 as eldisatslr when E1HISFTHFW=1.

The reference number 236 denotes a selector (an output means, an optional bit length saturation means) for selecting one of an output value from the selector 232 and an upper order 16-bit value elrisi2[0:15] of a value stored in the register 202 according to an output value eldisatshr from the selector 242 and for outputting a 16-bit value eldisatvhr. This selector 236 selects the output value eldisatvhi from the selector 232 as the value eldisatvhr when eldisatvhr=0 and it selects the 16-bit value elrisi2[0:15] as the value eldisatvhr when eldisatvhr=1.

The reference number 237 indicates a selector (an output means, an optional bit length saturation means) for selecting one of an output value from the selector 233 and a lower order 16-bit value elrisi2[16:31] of a value stored in the register 202 according to an output value eldisatslr from the selector 243 and for outputting a 16-bit value eldisatvhr. This selector 237 selects the output value eldisatvli from the selector 233 as the value eldisatvhr when eldisatvhr=0 and it selects the 16-bit value elrisi2[16:31] as the value eldisatvli when eldisatvhr=1.

The reference number 238 designates a selector (an output means, an optional bit length saturation means) for selecting one of a 16-bit data of zero and an output from the selector 236 according to values of control signals 211 and 212 and for outputting a 16-bit value eldisatvhz. This selector 238 selects the zero of the 16-bit data as eldisatvhz when both the control signals 211 and 212 are 1 and outputs the value eldisatvhr from the selector 236 when both the control signal 211 and 212 are not 1.

The reference number 239 designates a selector (an output means, an optional bit length saturation means) for selecting one of zero of a 16-bit data and an output from the selector 237 according to values of control signals 211 and 213 and for outputting a 16-bit value eldisatvlz. This selector 239 selects the zero of the 16-bit data as eldisatvlz when both the control signals 211 and 213 are 1 and outputs the value eldisatvlr from the selector 237 when both the control signal 211 and 213 are not 1.

The reference number 250 designates an operation unit (an output means, an optional bit length saturation means, a zero saturation means) for performing a bit combination operation. This operation unit 250 combines a 16-bit value eldisatvhz from the selector 238 and a 16-bit value eldisatvlz provided from the selector 239 and then for outputting a 32-bit value eldisatout.

Thus, in the saturation operation unit 21 in the microprocessor according to the present invention shown in FIG. 6, the optional-bit length saturation means mainly comprises the decoders 220 and 221, the selectors 234, 235, 236, 237, 238 and 239 and the operation units 226, 227, 228 and 250. This optional-bit length saturation means comprises the saturated value generation means comprising the decoders 220, 221, the judgement means comprising the selectors 234, 235 and the operation units 226, 227 and 228, and the output means comprising the selectors 236, 237, 238 and 239 and the operation unit 250. Specifically, the selectors 238 and 239 in the output means comprises the zero-saturation means.

Next, the operation of the microprocessor including the saturation operation unit 21 of the first embodiment will now be explained.

When an instruction to be executed is detected by the decoder 9 in the microprocessor shown in FIG. 1, the control signal 12 indicating numbers of actual registers as the registers Rb and Rc, immediate values, kinds of full-word instructions and half-word instructions are transferred to saturation operation unit 21. Then, an actual content in the general purpose register 5 specified as the register Rb is stored into the resister 202. When the instruction to be executed now is a full-word instruction, values of the bits #27 to #31 in the actual register in the general purpose register 5 specified as the Rc register or values of the bits #1 to #5 in a 6-bit immediate value are set into the register 201.

When the instruction to be executed now is a half-word instruction, values of the bits #12 to #15 in the actual register in the general purpose register 5 specified as the register Rc or values of the bits #2 to #5 in a 6-bit immediate value are set into the register 200 and values of the bits #28 to #31 in the actual register in the general purpose register 5 specified as the register Rc or values of the bits #2 to #5 in the 6-bit immediate value are set into the register 201.

The decoder 220 receives a 4-bit value stored in the register 200 and outputs a 16-bit decoded value eldisat16do. The output eldisat16do from the decoder 220 indicates the negative minimum value (the maximum value in absolute or the unsignaed maximum value) in saturation operation results performed with various ranges of 0 to 15 bits against the negative target saturation operation value Rb. In addition, the decoder 221 receives a 5-bit value stored in the register 201 and outputs a 32-bit decoded value eldisat32do. This value eldisat32do indicates the negative minimum value (the maximum value in absolute or the unsigned maximum value) in results as a saturation operation results performed with various optional ranges in 0 to 31 bits against the negative target saturation operation value Rb.

Hereinafter, cases in which half-word instructions are executed will be explained.

In the cases, the control signal 210 indicates the value "1". Accordingly, the selector 230 selects the output from the decoder 220. That is, the selector 230 outputs a 16-bit decoded value eldisat16do according to the Table A as the value eldisatvhd. The virtual converter 231 usually outputs the lower order 16-bits in the 32-bit decoded value eldisat32do as the value eldisatvld. That is, the lower order side bits (as shown in the right side in Table B) in each 32-bit output shown in Table B is output. When a half-word instruction is executed, the uppermost order bit in the input value shown in Table B usually becomes zero.

Accordingly, in this case, both the output value eldisatvhd from the selector 230 and the output value eldisatvld from the converter 231 are made based on a same regulation.

The output value eldisatvhd from the selector 230 is used as a saturated value when the half-word in the upper order side of the target saturation operation value Rb is a negative value. The output value eldisatvld from the converter 231 is used as a saturated value when the half-word in the lower order side of the target saturation operation value b.

The selector 234 and the operation unit 226 judge whether or not the half-word in the upper order side of the target saturation operation value Rb is over the maximum value when the half-word is a positive value and is less than the minimum value when the half-word is a negative value. Hereinafter, the maximum value when it is a positive value or the minimum value when a negative value is called as an absolute maximum value or an maximum value without sign. The selector 234 outputs a half-word in the upper order side in the target saturation operation value Rb when the sign of the half-word of the upper order side is zero.

In other words, the half-word in the upper order side in the target saturation operation value Rb is a positive number, the selector 234 outputs its half-word.

When the uppermost order bit (elrisi2[0]) in the register 202 is 1, the selector 234 outputs an inverted value of a half-word in the upper order side obtained by the inverted 224.

The operation unit 226 performs an arithmetic AND operation per bit between the value eldisatvhd transferred from the selector 230 and the value eldisatish from the selector 234. In this case, the selector 230 outputs a 16-bit decoded value eldisat16do. As understood by Table A, in the 16-bit decoded value eldisat16do, [the value of the register 200 −1]-bits from the lower order side are zero and the other upper order side are all 1. For example, when the set value of the register 200=0100 (B), the output value eldisatvhd from the selector 230 becomes $$1111\ 1111\ 1111\ 1000\ (B)\ (-8\ \text{in decimal}) \qquad (1)$$

In this case, the value not over a saturated value has the following range:

$$\text{from } 0000\ 0000\ 0000\ 0111\ (B)\ (+7\ \text{in decimal}) \text{ to } 1111\ 1111\ 1111\ 1000\ (B)\ (-8\ \text{in decimal}). \qquad (2)$$

When a negative number is inverted per bit, a saturated value has the following range in bit inversion:

$$\text{from } 0000\ 0000\ 0000\ 0000\ (B)\ (\text{zero in decimal}). \text{ to } 0000\ 0000\ 0000\ 0111\ (B)\ (7\ \text{in decimal}). \qquad (3)$$

Because a value of a positive number is not over a saturated value has the value shown in (2) or less, when an AND operation between the value shown in (1) and the value not over the saturated value, a result of the AND operation becomes a 16-bit value having all zero-bits.

Because a value of a negative number is not over a saturated value has the value shown in (3) or less in bit inverting, when an AND operation per bit is performed, a result of the AND operation becomes a 16-bit value having all zero-bits. That is, when the AND operation between a positive number and the value eldisatvhd is performed per bit and then the 16-bit value of all zero-bits is obtained as the AND operation result, the positive number is not over the saturated value. In addition, when the AND operation between the inverted value of a negative number and the value eldisatvhd is performed per bit and then the 16-bit value of all zero-bits is obtained as the AND operation result, the negative number is not over the saturated value.

When a NOR operation is performed by using a 16-bit value, the NOR operation result of the operation unit 226 is 1 only by using the 16-bit value of all zero-bits. That is, because the operation unit 226 must perform the NOR operation after execution of the AND operation, the operation result of the operation unit 226 becomes 1 unless a half-word in the upper order side in a target saturation operation value Rb is not over the saturated value. Accordingly, the result signal 214 indicating the saturation operation judgement result for the half-word in the upper order side becomes zero when the saturation operation judgement result is equal to the saturated value, and it becomes 1 when the result is not equal to the saturated value. That is, this judgement result being equal to the saturated value indicates that it is over the saturated value. On the other hand, this judgement result being not equal to the saturated value indicates that it is not over the saturated value.

The selector 235 outputs the half-word in the lower order side of the target saturation operation value Rb when a flag of the bit #16 (elrisi2[16]) in the register 202 is zero, namely when a flag of the half-word in the lower order side is zero. That is, the half-word in the lower order side of the target saturation operation unit Rb is a positive number, it outputs this positive number directly. When the value elrisi2[16] is 1, the selector 235 outputs the inverted value of the half-word in the lower order side inverted per bit by the inverter 225. At this time, because the control signal (E1HISFTHFW) 210 indicates 1, the selector 241 outputs the value elrisi2[16] as the value eldisatsli.

As described above in detail, when a half-word operation is performed, the output value eldisatvld from the virtual converter 231 is corresponding to a 16-bit decoded value eldisat16do. Accordingly, the operation unit 227 operates just like the operation unit 226 and outputs 1 unless a half-word in the lower order side is not saturated, and it outputs zero when the half-word in the lower order side is saturated. That is, the result signal 215 indicating the saturation operation judgement result of the half-word in the lower order side becomes zero when the judgement result indicates it is saturated and becomes 1 when the judgement result indicates it is not saturated. In this case, because the control signal (E1HISFTHFW) 210 indicates 1, the selector 242 provides the result signal 214 as the value eldisatshr into the selector 236. The selector 236 selects a half-word (elrisi2[0:15]) in the upper order side of the target saturation operation value Rb when the value eldisatshr=1, namely the judgement result indicates it is saturated. On the other hand, the selector 236 selects the value selected by the selector 232 when the value eldisatshr=0, namely the judgement result indicates it is not saturated.

The selector 232 outputs the output from the selector 230, namely a 16-bit decoded value elsisat16do when the uppermost order bit (elrisi2[0]) in a value stored in the register 202, namely the flag of a half-word in the upper order side is 1 (1=negative). As have been explained above, the number of bits, [(a value stored in the register 200)−1] from the lower order side are zero and other bits are 1 in the decoded value eldisat16do. In other words, when a 4-bit value stored in the register 200 is n, the value eldisat16do becomes $-2^{n-1}$. That is, it becomes a negative maximum value of the saturation operation result.

When the uppermost order bit (elrisi2[0]) in the register 202, namely the flag of the half-word in the upper order side becomes zero (0=positive), the selector 232 outputs the inverted value of the output from the selector 230 obtained by using inverting operation per bit. This output value is $2^{n-1}-1$ that is the positive absolute maximum value (or the positive unsigned maximum value) of the saturation operation result.

As described above, the selector 236 outputs the upper order half-word when the half-word in the upper order side of the target saturation operation value Rb is not saturated, outputs the absolute maximum value (or the unsigned maximum value) obtained by the saturation operation when it is saturated. Because the control signal (E1HISFTHFW) indicates 1, the selector 243 provides the result signal 215 as the value eldisatslr to the selector 237. The selector 237 selects the half-word (elrisi2[0:15]) in the lower order side of the target saturation operation value Rb when the value erdisatslr=1, namely the judgement result indicates that it is not saturated. The selector 237 selects the half-word (elrisi2 [0:15]) in the lower order side of the target saturation operation value Rb when the value eldisatslr=1, namely the judgement result indicates that it is not saturated. The selector 237 outputs the output from the selector 233 when the value eldisatshr=0, namely the judgement result indicates that it is saturated. In this case, the selector 233 receives the bit #16 (elrisi2[16]) in the register 202, namely the flag of the half-word in the lower order side, transferred from the selector 204. When the bit #16 is 1 (1=negative) and the selector 233 outputs the value corresponding to the decoded 16-bit value eldisat16do which is the output from the virtual converter 231. That is the selector 233 outputs the negative absolute maximum value (or the negative unsigned maximum value) as the saturation operation result. The selector 233 outputs the inverted value of the output from the selector 231, which is inverted per bit and which also is the positive maximum value as the saturation operation result when the bit #16 (elrisi2[16]) or the flag of the half-word in the lower order side is zero (0=positive).

As described above, the selector 237 outputs the half-word in the lower order side when the target saturation operation value Rb is not saturated, and outputs the maximum value as the saturation operation result when it is not saturated.

When the instruction that is currently executed is the SATA2H instruction and when both half-words in the target saturation operation value Rb are negative values, this target saturation operation value Rb must be saturated into zero. Therefore, the selector 228 outputs the 16-bit value of all zero-bits when the uppermost order bit (elrisi2[0]) in the register 202, namely the flag of the half-word in the upper order side is 1 (1=negative) when the control signal 211 indicates E1HISATZ=1, the instruction that is now executed is the SATZ2H instruction. When the control signal 211 indicates E1HISATZ=0, the selector 238 directly outputs the output from the selector 236.

Like the operation of the selector 238 described above, the selector 239 outputs the 16-bit value of all zero-bits when the flag of the half-word in the lower order side as the bit #16 (elrisi2[16]) in the register 202 is 1 (1=negative) and when the control signal 211 indicates E1HISATZ=1, namely when the instruction that is currently executed is the SATZ2H instruction. The selector 239 directly outputs the output from the selector 237 when the control signal 211 indicates E1HISATZ=0.

The operation unit 250 outputs a word-value eldisatout as the saturation operation result consisting of a 16-bit value transferred from the selector 238 as 16-bits in the upper order side and a 16-bit value transferred from the selector 239 as 16-bits in the lower order side. As the result, the operation unit 250 outputs the one-word value consisting both saturation operation results of two half-words.

Next, cases that full-word instructions are executed will be explained.

In these cases, the control signal (E1HISFTHFW) 210 indicates zero. Accordingly, the selector 230 selects the 16-bits in the upper order side of the output value eldisat32do from the decoder 221 as the value eldisatvhd. The value eldisatvld as the output from the virtual converter 231 is the 16-bits in the lower order side in the output value 32-bit shown in Table B. In this case, the selectors 234 and 235 and the operation units 226, 227 and 228 judge whether the 1-word target saturation operation value Rb is over the absolute maximum value (or the unsigned maximum value) or not. The selector 234 directly outputs the 16-bit in the upper order side of the target saturation operation value Rb when the uppermost order bit (elrisi2[0]), namely the flag of the target saturation operation value Rb, is zero. That is, when the target saturation operation value Rb is a positive number, the selector 234 directly outputs the 16-bits in the upper order side in the target saturation operation value Rb. When the uppermost order bit (elrisi2[0]) in the register 202 is 1, the selector 234 directly outputs an inverted value of the 16-bits in the upper order side inverted per bit by the inverter 224.

In full-word operations, the uppermost order bit (elrisi2 [0]) is the flag-bit for the entire of a 1-word. In this case, because the control signal 210 (E1HISFTHFW) indicates zero, the output value from the selector 241 is the uppermost order bit (elrisi2[0]) in the register 202. Accordingly, the selector 235 also receives the uppermost order bit (elrisi2 [0]) in the register 202. The selector 235 directly outputs a 16-bit value in the lower order side of the target saturation operation value Rb when the uppermost order bit (elrisi2[0]) in the register 202, namely the flag of the target saturation operation value Rb is zero. That is, when the target saturation operation value Rb is a positive number, the selector 235 directly outputs the 16-bit value in the lower order side and it outputs an inverted value of the 16-bit value in the lower order side, which is inverted per bit by the inverter 224, when the uppermost order bit (elrisi2[0]) in the register 202 is 1.

The operation unit 226 performs AND operations per bit between the output value eldisatvhd from the selector 230 and the output value eldisatish from the selector 234. The operation unit 227 performs AND operations per bit between the output value eldisatvld from the virtual converter 231 and the output value eldisatisl from the selector 235. In this case, the selector 230 outputs a 16-bit value in the upper order side of the 32-bit decoded value eldisat32do. In addition, the virtual converter 231 outputs the 16-bit value in the lower order side of the 32-bit decoded value eldisat32do. As clearly shown in Table B, the 32-bit decoded value eldisat32do consists of bits in which the numbers [(the value of the register 200) −1] from the lower order side are zero and other bits are 1.

For example, when the set value of the register 201 is 0100 (B), the output value from the selector 230 becomes as follows:

$$\text{eldisatvhd}=1111\ 1111\ 1111\ 1111\ (B). \tag{4}$$

The output value from the virtual converter 231 is as follows:

$$\text{eldisatvld}=1111\ 1111\ 1111\ 1000\ (B). \tag{5}$$

In this case, the 32-bit value which is not over the saturation value has the following range $$\text{from } 0000\ 0000\ 0000\ 0000\ 0000\ 0000\ 0000\ 0111\ (B)$$
$$(+7 \text{ in decimal}). \tag{6}$$

$$\text{to } 1111\ 1111\ 1111\ 1111\ 1111\ 1111\ 1111\ 1000\ (B)$$
$$(-8 \text{ in decimal}). \tag{7}$$

In the bit inverting for a negative number, it has the following range $$\text{from } 0000\ 0000\ 0000\ 0000\ 0000\ 0000\ 0000\ 0000\ (B)\ (0 \text{ in decimal}).\ \text{to } 0000\ 0000\ 0000\ 0000\ 0000\ 0000\ 0000\ 0111\ (B)\ (7 \text{ in decimal}). \tag{8}$$

In a positive number, because a value not being over a saturated value is not more than the value shown in (6), when bit operations between the 32-bit value shown in (4) and (5) and a value not being over the saturated value, the AND operation result becomes the 32-bit value of all zero-bits. In a negative number, because a bit-inverted value not being over a saturated value is not more than the 32-bit value shown in (8), when bit operations between the 32-bit value shown in (4) and (5) and a value not being over the saturated value, the AND operation result also becomes the 32-bit value of all zero-bits.

That is, when the AND operation per bit between the value eldisatish as the upper order 16-bits of the positive target saturation operation value Rb and the value shown in (4), the 16-bit value of all zero-bits can be obtained. In addition, when the AND operation per bit between the value eldisatisl as the lower order 16-bits of the positive target saturation operation value Rb and the value shown in (5) and when the 16-bit value of all zero-bits is obtained as the AND operation result, this positive number is not over the saturated value.

In addition, when the AND operation per bit between the bit-inverted value of the upper order 16-bits of the negative target saturation operation value Rb and the value eldisatvhd, the 16-bit value of all zero-bits can be obtained. Further, when the AND operation per bit between the bit-inverted value of the lower order 16-bits of the negative target saturation operation value Rb and the value eldisatvld, and when the 16-bit value of all zero-bits is obtained as the AND operation result, this negative number is not over the saturated value.

Since each of the operation units 226 and 227 performs a NOR operation after execution of an AND operation, unless the target saturation operation value Rb is not over the saturated value, both outputs of the operation units 226 and 227 become 1. Accordingly, the operation unit 228 for performing an AND operation between outputs from the operation units 226 and 227 outputs 1 unless the target saturation operation value Rb is not over the saturated value. Therefore the result signal 216 indicating the saturation operation judgement result for a full-word operation transferred from the operation unit 228 becomes zero when the judgement result indicates the saturation, and becomes 1 when indicates no saturation.

In this case, because the control signal 210 (E1HISFTHFW) indicates zero, the selector 242 gives the result signal 216 as the value eldisatshr into the selector 237. The selector 236 selects the upper 16-bits in the target saturation operation value Rb when the value eldisatshr is 1 (eldisatshr=1), namely the judgement result indicates no-saturation, and it selects the output value from the selector 232 when eldisatshr=0, namely the judgement result indicates the saturation. Likewise, the selector 237 selects the lower order 16-bits in the target saturation operation value Rb when eldisatslr=1, namely the judgement result indicates no-saturation and it selects the output value from the selector 233 when eldisatslr=0, namely the judgement result indicates the saturation.

The selector 232 outputs the output from the selector 230 when the uppermost order bit (elrisi2[0]) in the register 202, namely the flag of the target saturation operation value Rb is 1 (1=negative). In this case, the selector 232 directly outputs the upper order 16-bits in the decoded value eldisat32do.

The decoded value eldisat32do, as has already been explained, consists of bit numbers [(the value of the register 200) −1] being zero and other upper side bits being 1. In other words, when a 4-bit value set in the register 200 is n, the value eldisat32so becomes $-2^{n-1}$. That is, the value eldisat32do becomes the negative maximum value in the saturation operation results. In this case, the selector 232 outputs the upper order 16-bits in the negative absolute maximum value (or the negative unsigned maximum value). Likewise, the selector 233 outputs the lower order side 16-bits in the negative absolute maximum value (or the negative unsigned maximum value) when the flag of the target saturation operation value is 1 (1=negative).

Because the control signal 210 (E1HISFTHFW) indicates zero, the selector 240 provides the maximum order bit (elrisi2[0]) in the register 202 as a flag of the target saturation operation value Rb.

When the uppermost order bit (elrisi2[0]) in the register 202, namely the flag of the target saturation operation value is zero (0=positive), the selector 232 outputs the bit-inverted value of the output from the selector 230. This value is the upper order 16-bits in the value expressed by using a 32-bit value $2^{n-1}$ −1 and this value also is the upper order 16-bits in the positive absolute maximum value (or the positive unsigned maximum value) of the saturation operation result. In addition the selector 233 outputs the bit-inverted value of the lower order side of a value which is expressed by using a 32-bit value $2^{n-1}$ −1 and this value also is the lower order 16-bits in the positive maximum value (or the positive unsigned maximum value) of the saturation operation result.

As described above, the selector 236 directly outputs the upper order 16-bits in the target saturation operation value Rb when the target saturation operation value of a full-word is not over the saturated value. The selector 236 outputs the upper order 16-bits in the absolute maximum value (or the unsigned maximum value) in the saturation operation result when the target saturation operation value of a full-word is over the saturated value.

Furthermore, the selector 237 directly outputs the lower order 16-bits in the target saturation operation value Rb when the target saturation operation value of a full-word is not over the saturated value. The selector 237 outputs the lower order 16-bits in the absolute maximum value (or the unsigned maximum value) in the saturation operation result when the target saturation operation value of a full-word is over the saturated value.

When the instruction to be now executed is the SATZ instruction and the target saturation operation value Rb is a negative value, the target saturation operation value muse be saturated into zero. Accordingly, the selector 238 outputs the 16-bit value of all zero-bits when the uppermost order bit (elrisi2[0]) in the register 202, namely the flag of the target saturation operation value Rb is 1 (1=negative) and when the control signal 211 indicates E1HISATZ=1, namely the instruction to be now executed is the SATZ instruction. When the control signal 211 indicates E1HISATZ=0, the selector 238 directly outputs the output from the selector 236.

Likewise this, the selector 239 outputs the 16-bit value of all zero-bits when the uppermost order bit (elrisi2[0]) in the register 202, namely the flag of the target saturation operation value Rb is 1 (1=negative) and when the control signal 211 indicates E1HISATZ=1, namely the instruction to be now executed is the SATZ instruction. When the control signal 211 indicates E1HISATZ=0, the selector 239 directly outputs the output from the selector 237.

The operation unit 250 outputs the one-word value eldisatout as the saturation operation result. The one-word value consists of upper order 16-bits and lower order 16-bits. The upper order 16-bits are the value eldisatvhz that is the output from the selector 238 and the lower order 16-bits are the value eldisatvlz that is the output from the selector 239.

As described in detail, by using the saturation operation unit 21 according to the first embodiment, saturation operations in order to saturate data into an optional-bit length value can be executed in one instruction. Accordingly, microprocessors incorporating the saturation operation unit 21 of the first embodiment according to the present invention can execute saturation instructions such as the MPEG2 video decoding operation and the like which require the saturation operation to saturate data into values of various kinds of optional-bit lengths by using a small number of instruction codes and within short clock cycles which are less than those of conventional microprocessors. In addition, the saturation operation can be executed per sub-word. Furthermore, when a target saturation operation value is a negative value, it can be saturated into zero, so that the present invention can provide a circumstance where application processing can be easily performed.

Second embodiment

Figure 7:
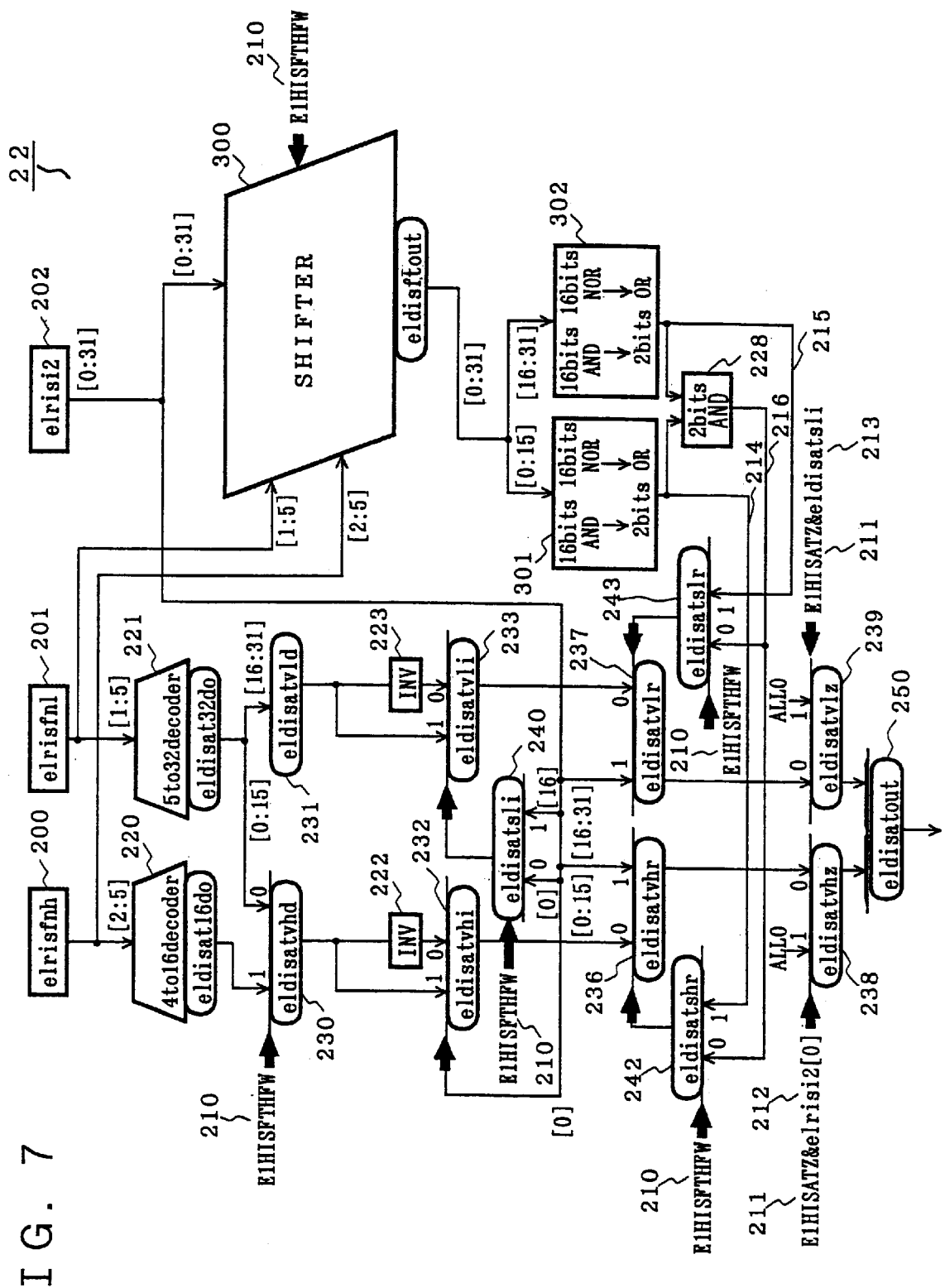
FIG. 7 is a block diagram showing a configuration of a saturation operation unit incorporated in the microprocessor of the second embodiment according to the present invention.

FIG. 7 is a block diagram showing a configuration of a saturation operation unit 22 incorporated in the microprocessor of the second embodiment according to the present invention.

In FIG. 7, the reference number 300 designates a 32-bit shifter (a judgement means, an optional-bit length saturation means, a sub-word judgement means) for performing an arithmetic right shift operation according to a shift number without a sign. The reference number 301 denotes an operation unit (a judgement means, an optional-bit length saturation means, a sub-word judgement means) for outputting zero as a result signal 214, which indicates data is not saturated, of the upper order side saturation operation judgement when all of the upper order 16-bits in the output value eldisftout from the shifter 300 are 1 or zero. The reference number 302 designates an operation unit (a judgement means, an optional-bit length saturation means, a sub-word judgement means) for outputting zero as the result signal 215 of a lower order side saturation operation that means it is not saturated when the all 16-bits in the lower order side of the output value eldisftout from the shifter 300 are 1 or zero.

The other components incorporated in the saturation operation unit 22 of the second embodiment are equal to that of the saturation operation unit 21 of the first embodiment. Therefore the explanation for the other components are omitted here.

Next, the operation of the saturation operation unit 22 of the second embodiment will be explained.

An actual register number in the general purpose register 5 specified as the register Rb for storing an instruction to be executed is set into the register 202.

When the instruction to be now executed is a full-word instruction, the value of the bits #27 to #31 in an actual register in the general purpose register 5 specified as the register Rc or the value of the bits #1 to #5 in a 6-bit immediate value is set into the register 201.

When the instruction to be now executed is a half-word instruction, the value of the bits #12 to #15 in an actual register in the general purpose register 5 specified as the register Rc or the value of the bits #2 to #5 in a 6-bit immediate value is set into the register 200 and the value of the bits #28 to #31 or the value of the bits #2 to #5 in the 6-bit immediate value is set into the register 201.

The decoder 220 receives a 4-bit value stored in the register 200 and then outputs a 16-bit decoded value eldisat16do, like the decoder in the saturation operation unit 21 in the microprocessor according to the first embodiment. This output value indicates the negative absolute maximum value (or the negative unsigned maximum value) in saturation operation results obtained by performing saturation operations within a range of zero to 15 bits against a negative saturation operation value Rb. In addition, the decoder 221 receives a 5-bit value written into the register 201 and outputs a 32-bit decoded value eldisat32do. This 32-bit decoded value indicates the negative absolute maximum value (or the negative unsigned maximum value) in saturation operation results executed in a range in 0 to 31-bits against the negative target saturation operation value Rb.

Hereinafter, cases where half-word instructions are executed will be explained.

In the cases, the control signal 210 (E1HISFTHFW) indicates 1. When E1HISFTHFW=1, the shifter 300 receives two half-words from the register 202 and a 4-bit value from the register 200, a 5-bit value from the register 201. The shifter treats each value transferred from the registers 200 and 201 as values without sign and it operates a shifter of two stages each having 16-bits.

The 4-bit value set in the register 200 is a saturation operation bit length bith_sat. The shifter 300 arithmetically shifts the half-word in the upper order side toward the right side only by a bit-number specified by the 4-bit value from the register 200. The shift operation result is obtained by shifting out all-bits within a range permitted in the saturation operation. That is, the half-word in the upper order side is not over the saturated value and it is a positive number, the shifting result becomes the 16-bit value of all zero-bits. When the half-word in the upper order side is not over the saturated value and it is a negative value, the shifting result becomes the 16-bit value of all 1. In addition, when the half-word in the upper order side is over the saturated value, the bit-value 1 or zero is remained in the shifting result.

Likewise, the half-word in the lower order side is arithmetically shifted toward the right side by the bit number specified by the lower order 4-bits in the 5-bit value from the register 201. When the half-word in the lower order side is not over the saturated value and it is a positive value, the shifting result becomes the 16-bit value of all zero-bits. In addition, when the half-word in the lower order side is not over the saturated value and it is a negative value, the shifting result becomes the 16-bit value of all 1. When the half-word in the lower order side is over the saturated value, the bit of zero or 1 is remained in the shifting result.

For example, when the set value in the register 200 is 0100 (B), values which are not over the saturated value are in the following range:

from *0000 0000 0000 0111* (*B*) (+7 in decimal) to *1111 1111 1111 1000* (*B*) (−8 in decimal).

Accordingly, when a value that is not over the saturated value is shifted toward right by 4-bits and it is a positive number, the shifting result becomes the value of all zero-bits. When it is a negative value, the shifting result becomes the value each bit of which is 1. The shifter 300 outputs a value eldisftout consisting of upper order 16-bits and lower order 16-bits. The upper order 16-bits are the shifting result of the half-word in the upper order side and the lower order 16-bits are the shifting result of the half-word in the lower order side in the target saturation operation value.

The operation unit 301 judges whether the all-bits in the upper order 16-bit value eldisftout from the shifter 300 is 1 or zero. For example, the operation unit 301 performs AND operations per bit for the value eldisftout. and it also performs NOR operations per bit for the value eldisftout. Then, it performs the AND operation between the AND operation result and the NOR operation result. When all-bits in the result are 1 or zero, that is, when the half-word in the upper order side is not over the saturated value, the AND operation result becomes 1. The operation unit 301 outputs this AND operation result as the result signal 214.

The operation unit 302 judges whether the all-bits in the lower order 16-bit value eldisftout from the shifter 300 is 1 or zero. For example, the operation unit 302 performs AND operations per bit for the value eldisftout. and it also performs NOR operations per bit for the value eldisftout. Then, it performs the AND operation between the AND operation result and the NOR operation result. When all-bits in the result are 1 or zero, the AND operation result becomes 1. The operation unit 302 outputs this AND operation result as the result signal 215.

Following operations of the saturation operation unit 22 is the same as those of the operation unit 21 of the first embodiment. Accordingly, the operation units 250 outputs a word-value eldisatout as the saturation operation result which consists of a half-word of upper order 16-bits and a half-word of lower order 16-bits. The upper order 16-bit value is the value eldisatvhz provided from the selector 238 and the lower order 16-bit value that is the value eldisatvlz provided from the selector 239.

Hereinafter, cases where full-word instructions are executed will be explained.

In those cases, the control signal 210 (E1HISFTHFW) indicates zero. When E1HISFTHFW=1, the shifter 300 receives the target saturation operation value Rb of a full-word from the register 202 and a 5-bit value from the register 201. The shifter 300 treats the 5-bit value from the register 201 as a value without sign and it operates a shifter of one stage having 32-bits.

The 5-bit value set in the register 201 is a saturation operation bit length bit_sat. The shifter 300 arithmetically shifts the target saturation operation value Rb toward right only by a bit-number specified by the 5-bit value from the register 201. The shift operation result becomes the 32-bit-value of all zero-bits when the target saturation operation value Rb is not over the saturated value and it is a positive number. On the other hand, when the target saturation operation value Rb is not over the saturated value and it is a negative number, the saturation operation result becomes the 32-bit value of all 1. In addition, when the target saturation operation value Rb is over the saturated value, 1 or zero bit are remained in the 32-bit saturation operation result.

The shifter 300 outputs the shifting result as the value eldisftout. Each of the operation units 301 and 302 judges whether all of the upper order 16-bits or all of the lower order 16-bits in the value eldisftout from the shifter 300 are 1 or zero. When the all of the upper or lower order 16-bits are 1 or zero, that is, the target saturation operation value Rb is not over the saturated value, both of the outputs from the operation units 301 and 302. When the target saturation operation value Rb is over the saturated value, one of both of the outputs from the operation units 301 and 302 become zero. Each of the operation units 301 and 302 outputs a judgement result as the result signal 214, 215, respectively. The arithmetic unit 228 performs the AND operation between the result signals 214 and 215 and then outputs the AND operation result as the result signal 216. The result signal 216 becomes 1 when both of the result signals 214 and 215 are 1, namely the target saturation operation value Rb is over the saturated value.

Following operations of the saturation operation unit 22 of the second embodiment is the same as those of the operation unit 21 of the first embodiment. Accordingly, the operation units 250 outputs a word-value eldisatout as the saturation operation result which consists of a half-word of upper order 16-bits and a half-word of lower order 16-bits. The upper order 16-bit value is the value eldisatvhz provided from the selector 238 and the lower order 16-bit value that is the value eldisatvlz provided from the selector 239.

By using the saturation operation unit 22 of the second embodiment, it can be achieved to perform a saturation operation to saturate data into an optional-bit length value only by one instruction. Accordingly, the microprocessor incorporating the saturation operation unit 22 of the second embodiment can execute applications which require to execute saturation operations in order to saturate data into various kinds of bit length data items, like in MPEG2 video processing, by a small number of instructions and within a small number of clock cycles when it compares with conventional microprocessors. In addition, in the microprocessor having the saturation operation unit of the second embodiment, saturation operations can be executed per sub-word. Furthermore, when a target saturation operation value is a negative value, it can be saturated into zero. Therefore the present invention can provide a circumstance in which application processing can be easily performed.

Third embodiment

Figure 8:
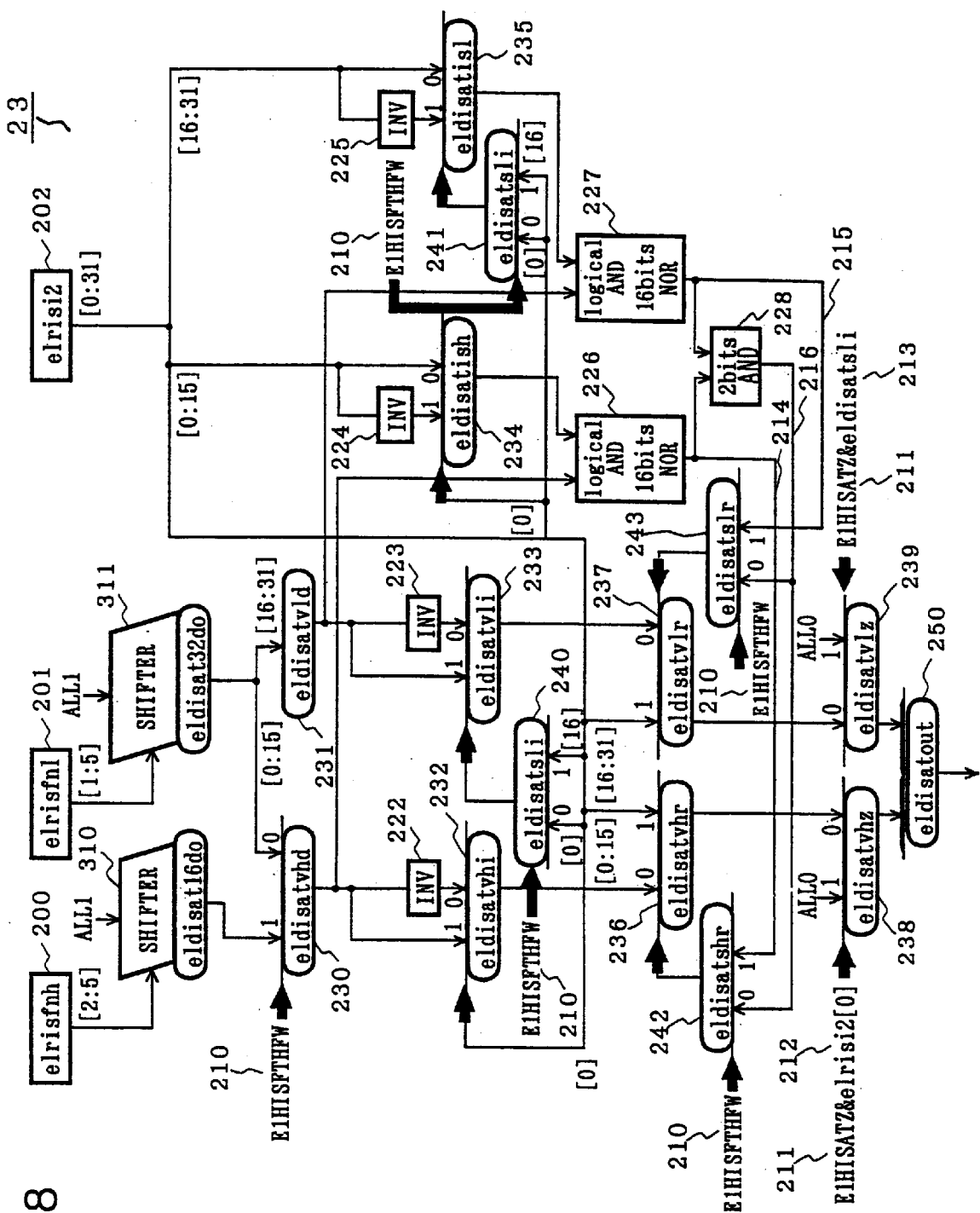
FIG. 8 is a block diagram showing a configuration of a saturation operation unit incorporated in the microprocessor of the third embodiment according to the present invention.

FIG. 8 is a block diagram showing a configuration of a saturation operation unit 23 incorporated in the microprocessor of the third embodiment according to the present invention.

In FIG. 8, the reference number 310 designates a shifter (a saturated value generation means, an optional-bit length saturation means, a sub-word saturated value generation means) that is incorporated instead of the decoded 220 in the saturation operation unit 21 according to the first embodiment shown in FIG. 6. The reference number 311 denotes a shifter (a saturated value generation means, an optional-bit length saturation means, a sub-word saturated value generation means) that is incorporated instead of the decoded 221 in the saturation operation unit 21 according to the first embodiment shown in FIG. 6. The other components incorporated in the saturation operation unit 23 of the third embodiment are equal to that of the saturation operation unit 21 of the first embodiment. Therefore the explanation for the other components are omitted here.

Next, the operation of the saturation operation unit 22 of the third embodiment will be explained.

The shifter 310 is a 16-bit shifter for shifting the target shift 16-bit value of all 1-bits such as "1111 1111 1111 1111 (B)" toward left by a value indicated by [a 4-bit value] −1, the 4-bit value is stored in the register 200. Where, the 4-bit value stored in the register 200 is treated as a value without sign.

The shifter 311 is a 32-bit shifter for shifting the target shift 32-bit value of all 1-bits such as "1111 1111 1111 1111 1111 1111 1111 1111 (B)" toward left by a value indicated by (a 5-bit value) −1, the 5-bit value is stored in the register 201. Where, the 5-bit value stored in the register 201 is treated as a value without sign.

The decoder 220 in the saturation operation unit as the first embodiment shown in FIG. 6 decodes a 4-bit length value, in order to store a saturation operation bit length bith_sat, stored on the register 200 and then outputs a 16-bit decoded value. This decoded value, as clearly shown in Table A, is a value obtained by shifting the 16-bit value "1111 1111 1111 1111 (B)" by [(a 4-bit value stored in the register 200) −1] toward left. Further, the decoder 221 in the saturation operation unit 21 as the first embodiment shown in FIG. 6 decodes a 5-bit length value, in order to store a saturation operation bit length bit_sat, stored on the register 201 and then outputs a 32-bit decoded value. This decoded value, as clearly shown in Table B. is a value obtained by shifting the 16-bit value "1111 1111 1111 1111 1111 1111 1111 1111 (B)" by [(a 5-bit value stored in the register 201) −1] toward left.

That is, the shift results executed by the shifters 310 and 311 are equal to the outputs eldisat16do and eldisat32do from the shifters 220 and 221. Accordingly, the saturation operation unit 23 of the third embodiment shown in FIG. 8 can operate just like the saturation operation unit 21 of the first embodiment shown in FIG. 6.

In the explanation of the saturation operation unit 23 according to the third embodiment, the shifters 310 and 311 are incorporated in a saturation operation unit instead of the decoders 220 and 221 of the first embodiment shown in FIG. 7, but the present invention is not limited by this configuration and manner, for example, it can be acceptable to incorporate the shifters 310 and 311 instead of the decoders 220 and 221 incorporated in the saturation operation unit 22 of the second embodiment shown in FIG. 7.

By using the saturation operation unit 23 of the third embodiment, it can be achieved to perform a saturation operation in order to saturate data into an optional-bit length value only by one instruction. Accordingly, the microprocessor incorporating the saturation operation unit 23 of the third embodiment can execute applications which require to execute saturation operations in order to saturate data into various kinds of bit length data items, like in MPEG2 video processing, by a small number of instructions and within a smaller number of clock cycles when it compares with conventional microprocessors. In addition, in the microprocessor having the saturation operation unit 23 of the third embodiment, saturation operations can be executed per sub-word. Furthermore, when a target saturation operation value is a negative value, it can be saturated into zero. Therefore the present invention can provide a circumstance in which application processing can be easily performed.

As described above, the present invention has an effect that each saturation operation for saturating data into an optional-bit length value can be executed by using one-instruction because a microprocessor having an instruction set including saturation operation instructions according to the present invention comprises an optional-bit length saturation means for saturating a target saturation operation value to a saturated value expressed in an optional-bit length specified by the instruction. This makes it possible to execute each saturation operation by using a smaller number of instruction codes and within a small number of clock cycles.

Furthermore, the present invention has an effect that each saturation operation for saturating data into an optional-bit length value can be executed by using one-instruction because a microprocessor having an instruction set including saturation operation instructions according to the present invention comprises a saturated value generation means for generating a saturated value of a bit length specified by an instruction and an output means for outputting a value generated by the saturated value generation means when a target saturation operation value is over a saturated value.

Moreover, the present invention has an effect to provide a circumstance where application processes can be more easily performed because a microprocessor having an instruction set including saturation operation instructions according to the present invention comprises a zero saturation means for saturating a negative saturation operation value into zero.

In addition, the present invention has an effect to provide a circumstance in which application processes can be more easily performed because a microprocessor having an instruction set including saturation operation instructions according to the present invention comprises a saturated value generation means generates a saturated value per sub-word and can judge whether the target saturation operation value is over the saturated value per sub-word or not, so that because the microprocessor can execute saturation operations per sub-word.

Furthermore, the present invention has an effect to provide a circumstance in which application processes can be more easily performed because a microprocessor having an instruction set including saturation operation instructions according to the present invention comprises a decoder for decoding a saturated value expressed by using a bit length which is specified by the saturation operation generation means based on a saturation instruction into a binary value having a bit length of a target saturation operation value, so that the microprocessor can perform saturation operations and sub-word saturation operations to saturate data into a saturation value of an optional-bit length.

Moreover, the present invention has an effect to execute each saturation instruction and each sub-word saturation instruction by using one instruction under a simple configuration of a microprocessor because this microprocessor having an instruction set including saturation operation instructions according to the present invention comprises a shifter for shifting the data of all 1-bits to generate a saturated value.

Furthermore, the present invention has an effect to execute each saturation instruction and each sub-word saturation instruction to generate an optional-bit length data by using one instruction under a simple configuration of a microprocessor because this microprocessor having an instruction set including saturation operation instructions according to the present invention comprises a shifter for shifting a target saturation operation value per bit by a bit length specified by a judgement means based on an instruction.

While the above provides a full and complete disclosure of the preferred embodiments of the present invention, various modifications, alternate constructions and equivalents may be employed without departing from the true spirit and scope of the invention. Therefore the above description and illustration should not be construed as limiting the scope of the invention, which is defined by the appended claims.

What is claimed is:

1. A microprocessor comprising:
    an instruction decoder for decoding instructions in an instruction set, said instructions including a saturation operation instruction;
    a plurality of registers for storing data items; and
    an instruction execution section for executing said instructions based on outputs from said instruction decoder, said instruction execution section comprising a saturation operation unit for executing said saturation operation instruction, said saturation operation unit comprising optional-bit length saturation means for saturating a target saturation operation value into a saturated value when said target saturation operation value being over said saturated value expressed by using optional-bit length data specified by said saturation operation instruction wherein said optional-bit saturation means comprises:
- judgement means for judging whether or not said target saturation operation value is over said saturated value;
- saturated value generation means for generating a saturated value of an optional-bit length specified by said saturation operation instruction; and
- output means for outputting said saturated value transferred from said saturated value generation means when said judgement means detects said target saturation operation value is over the saturated value.

2. A microprocessor as claimed in claim 1, wherein said output means comprises zero saturation means for saturating a negative target saturation operation value into zero.

3. A microprocessor as claimed in claim 1, wherein said saturated value generation means comprises sub-word saturated value generation means for generating a saturated value per subword and said judgement means comprises sub-word judgement means for judging whether or not said target saturation operation value is over said saturated value.

4. A microprocessor as claimed in claim 2, wherein said saturated value generation means comprises sub-word saturated value generation means for generating a saturated value per subword and said judgement means comprises sub-word judgement means for judging whether or not said target saturation operation value is over said saturated value.

5. A microprocessor as claimed in claim 1, wherein said saturated value generation means comprises a decoder for decoding a saturated value expressed by using a bit length specified by said saturation operation instruction into a binary value having a bit length of said target saturation operation value.

6. A microprocessor as claimed in claim 2, wherein said saturated value generation means comprises a decoder for decoding a saturated value expressed by using a bit length specified by said saturation operation instruction into a binary value having a bit length of said target saturation operation value.

7. A microprocessor as claimed in claim 3, wherein said saturated value generation means comprises a decoder for decoding a saturated value expressed by using a bit length specified by said saturation operation instruction into a binary value having a bit length of said target saturation operation value.

8. A microprocessor as claimed in claim 1, wherein said saturated value generation means comprises a shifter for generating a saturated value by shifting data, each-bit of said data being 1.

9. A microprocessor as claimed in claim 2, wherein said saturated value generation means comprises a shifter for generating a saturated value by shifting data, each-bit of said data being 1.

10. A microprocessor as claimed in claim 3, wherein said saturated value generation means comprises a shifter for generating a saturated value by shifting data, each-bit of said data being 1.

11. A microprocessor as claimed in claim 1, wherein said judgement means comprises a shifter for shifting said target saturation operation value by a bit length specified by said saturation operation instruction.

12. A microprocessor as claimed in claim 2, wherein said judgement means comprises a shifter for shifting said target saturation operation value by a bit length specified by said saturation operation instruction.

13. A microprocessor as claimed in claim 3, wherein said judgement means comprises a shifter for shifting said target saturation operation value by a bit length specified by said saturation operation instruction.

14. A microprocessor as claimed in claim 5, wherein said judgement means comprises a shifter for shifting said target saturation operation value by a bit length specified by said saturation operation instruction.

15. A microprocessor comprising:
- an instruction decoder for sequentially decoding instructions in a computer program, said instructions including a saturation operation instruction having a first field for designating an operation code of a saturation operation and a second field for designating a saturation value;
- a register for storing a target value; and
- an instruction execution unit for performing operations based on respective decoded results of said instructions output from said instruction decoder, said instruction execution unit comprising a saturation operation unit for receiving the target value from said register, for saturating, on the basis of a decoded result of said saturation operation instruction output from said instruction decoder, the target value into the saturation value designated by said second field when the target value is over the saturation value.

16. The microprocessor as claimed in claim 15, wherein
said second field specifies a bit length value indicating each bit length of 1 bit to n bits, while the target value has $2^n$ bits, n being an integer, and
said saturation operation unit saturates the target value into a value indicating $2^m$ as the saturation value, m being the bit length value specified in said second field between 1 to n.

17. The microprocessor as claimed in claim 16, wherein n is 5.

18. The microprocessor as claimed in claim 15, wherein said saturation operation instruction has a third field for designating said register.

19. The microprocessor as claimed in claim 15, further comprising;
a second register storing a value indicating the saturation value and another saturation value,
wherein said register stores $2^n$ bit data value, n bits of which indicates the target value and the other n bits indicates another target value, and
the second field of said saturation operation instruction specifies said second register, said saturation operation unit saturating, on the basis of the decoded result of said saturation operation instruction, the other target value into the other saturation value when the other target value is over the other saturation value.

20. The microprocessor as claimed in claim 15, wherein said register stores a $2^n$ bit data value, n bits of which indicate the target value and the other n bits indicate another target value, and
said saturation operation unit saturates, on the basis of the decoded result of said saturation operation instruction, the other target value into the saturation value when the other target value is over the saturation value.

* * * * *